United States Patent [19]

Miller et al.

[11] Patent Number: 5,648,642
[45] Date of Patent: Jul. 15, 1997

[54] OBJECT POSITION DETECTOR

[75] Inventors: Robert J. Miller, San Jose; Stephen J. Bisset, Los Altos, both of Calif.

[73] Assignee: Synaptics, Incorporated, San Jose, Calif.

[21] Appl. No.: 329,809

[22] Filed: Oct. 25, 1994

Related U.S. Application Data

[63] Continuation of Ser. No. 895,934, Jun. 8, 1992, abandoned.

[51] Int. Cl.⁶ .................................................. G08C 21/00
[52] U.S. Cl. ........................................... 178/18; 341/33
[58] Field of Search .............................. 324/690; 178/18, 178/19, 20; 345/173, 174, 175, 176, 177, 178; 341/33, 34

[56] References Cited

U.S. PATENT DOCUMENTS

| | | | |
|---|---|---|---|
| Re. 23,030 | 8/1948 | Holt | 122/260 |
| 1,590,008 | 6/1926 | Whitmore et al. | 324/395 |
| 2,219,497 | 10/1940 | Stevens et al. | 324/687 |
| 2,546,307 | 3/1951 | Johnson et al. | 327/310 |
| 3,020,850 | 2/1962 | Meckenstock | 415/110 |
| 3,128,458 | 4/1964 | Romero | 345/179 |
| 3,198,937 | 8/1965 | Wooster | 341/9 |
| 3,207,905 | 9/1965 | Bray | 250/208.4 |
| 3,244,369 | 4/1966 | Nassimbene | 235/145 |
| 3,256,386 | 6/1966 | Morchand | 348/485 |
| 3,263,126 | 7/1966 | Westberg | 315/241 S |
| 3,292,489 | 12/1966 | Johnson et al. | 353/25 |
| 3,382,588 | 5/1968 | Serrell et al. | 434/314 |
| 3,401,470 | 9/1968 | Gaven | 434/308 |
| 3,437,795 | 4/1969 | Kuljian | 235/451 |
| 3,482,241 | 12/1969 | Johnson | 345/174 |
| 3,492,440 | 1/1970 | Cerbone et al. | 379/355 |
| 3,493,791 | 2/1970 | Adelson et al. | 327/450 |
| 3,497,617 | 2/1970 | Ellis et al. | 178/19 |
| 3,497,966 | 3/1970 | Gaven | 434/315 |
| 3,501,342 | 3/1970 | Haberecht et al. | 428/195 |
| 3,516,176 | 6/1970 | Cleary et al. | 434/315 |
| 3,519,105 | 7/1970 | Geil | 187/380 |
| 3,522,664 | 8/1970 | Lambright et al. | 434/324 |
| 3,530,310 | 9/1970 | Adelson et al. | 327/467 |
| 3,530,312 | 9/1970 | Adelson et al. | 327/445 |
| 3,543,056 | 11/1970 | Klein | 327/517 |
| 3,549,909 | 12/1970 | Adelson et al. | 307/252 |
| 3,582,827 | 6/1971 | Bjerede | 331/135 |
| 3,588,875 | 6/1971 | Gabor | 340/347 |
| 3,591,749 | 7/1971 | Comstock | 200/167 R |
| 3,593,115 | 7/1971 | Dym et al. | 323/93 |
| 3,598,903 | 8/1971 | Johnson et al. | 178/18 |
| 3,623,082 | 11/1971 | Stein et al. | 340/365 |
| 3,651,463 | 3/1972 | Rawson et al. | 340/147 R |
| 3,662,378 | 5/1972 | MacArthur | 340/347 DD |
| 3,675,239 | 7/1972 | Ackerman et al. | 340/365 |
| 3,683,371 | 8/1972 | Holz | 340/365 |

(List continued on next page.)

FOREIGN PATENT DOCUMENTS

| | | | |
|---|---|---|---|
| 2662528 | 5/1990 | France . | |
| 2 139 762 | 11/1984 | United Kingdom | G06F 3/033 |
| 9103039 | 3/1991 | WIPO . | |

OTHER PUBLICATIONS

Chun et al., "A High-Performance Silicon Tactile Imager Based on a Capacitive Cell", IEEE Transactions on Electron Devices, vol. ED–32, No. 7, Jul. 1985, pp. 1196–1201.

*Primary Examiner*—Stephen Chin
*Assistant Examiner*—Kevin Kim
*Attorney, Agent, or Firm*—D'Alessandro & Ritchie

[57] ABSTRACT

A proximity sensor system includes a sensor matrix array having a characteristic capacitance between horizontal and vertical conductors connected to sensor pads. The capacitance changes as a function of the proximity of an object or objects to the sensor matrix. The change in capacitance of each node in both the X and Y directions of the matrix due to the approach of an object is converted to a set of voltages in the X and Y directions. These voltages are processed by analog circuitry to develop electrical signals representative of the centroid of the profile of the object, i.e. its position in the X and Y dimensions. The profile of position may also be integrated to provide Z-axis (pressure) information.

38 Claims, 17 Drawing Sheets

U.S. PATENT DOCUMENTS

| | | | |
|---|---|---|---|
| 3,696,409 | 10/1972 | Braaten | 340/365 |
| 3,732,389 | 5/1973 | Kaelin et al. | 200/167 A |
| 3,737,670 | 6/1973 | Larson | 307/116 |
| 3,751,612 | 8/1973 | Hansen | 200/52 R |
| 3,757,322 | 9/1973 | Barkan et al. | 340/365 C |
| 3,760,392 | 9/1973 | Stich | 340/200 |
| 3,773,989 | 11/1973 | Hacon | 200/52 R |
| 3,875,331 | 4/1975 | Halsenbalg | 178/19 |
| 3,921,166 | 11/1975 | Volpe | 340/365 C |
| 3,931,610 | 1/1976 | Marin et al. | 340/172.5 |
| 3,932,862 | 1/1976 | Graven | 340/324 M |
| 3,974,332 | 8/1976 | Abe et al. | 178/18 |
| 3,992,579 | 11/1976 | Dym et al. | 178/18 |
| 3,999,012 | 12/1976 | Dym | 178/18 |
| 4,001,807 | 1/1977 | Dallimonti | 340/324 A |
| 4,007,454 | 2/1977 | Cain et al. | 340/200 |
| 4,056,699 | 11/1977 | Jordan | 200/5 A |
| 4,058,765 | 11/1977 | Richardson et al. | 324/61 R |
| 4,071,691 | 1/1978 | Pepper, Jr. | 178/19 |
| 4,087,625 | 5/1978 | Dym et al. | 178/19 |
| 4,103,252 | 7/1978 | Bobick | 331/48 |
| 4,129,747 | 12/1978 | Pepper, Jr. | 178/19 |
| 4,148,014 | 4/1979 | Burson | 340/709 |
| 4,177,354 | 12/1979 | Mathews | 178/18 |
| 4,177,421 | 12/1979 | Thornburg | 324/61 R |
| 4,198,539 | 4/1980 | Pepper, Jr. | 178/18 |
| 4,221,975 | 9/1980 | Ledniczki et al. | 307/116 |
| 4,224,615 | 9/1980 | Penz | 340/712 |
| 4,232,311 | 11/1980 | Agneta | 340/703 |
| 4,246,452 | 1/1981 | Chandler | 200/5 A |
| 4,257,117 | 3/1981 | Besson | 368/69 |
| 4,264,903 | 4/1981 | Bigelow | 340/365 C |
| 4,281,323 | 7/1981 | Burnett et al. | 340/712 |
| 4,290,052 | 9/1981 | Eichelberger et al. | 340/365 C |
| 4,290,061 | 9/1981 | Serrano | 340/712 |
| 4,291,303 | 9/1981 | Cutler | 340/711 |
| 4,293,734 | 10/1981 | Pepper, Jr. | 178/18 |
| 4,302,011 | 11/1981 | Pepper, Jr. | 273/85 |
| 4,310,839 | 1/1982 | Schwerdt | 340/712 |
| 4,313,113 | 1/1982 | Thornburg | 340/709 |
| 4,334,219 | 6/1982 | Paülus et al. | 340/712 |
| 4,371,746 | 2/1983 | Pepper, Jr. | 178/18 |
| 4,373,784 | 2/1983 | Nonomura et al. | 350/336 |
| 4,398,181 | 8/1983 | Yamamoto | 340/365 S |
| 4,410,749 | 10/1983 | Janko et al. | 340/365 C |
| 4,423,286 | 12/1983 | Bergeron | 178/19 |
| 4,430,917 | 2/1984 | Pepper, Jr. | 84/1.01 |
| 4,442,317 | 4/1984 | Tandrell | 178/18 |
| 4,455,452 | 6/1984 | Schuyler | 178/18 |
| 4,475,235 | 10/1984 | Graham | 382/3 |
| 4,476,463 | 10/1984 | Ng et al. | 340/712 |
| 4,511,760 | 4/1985 | Garwin et al. | 178/18 |
| 4,550,221 | 10/1985 | Mabusth | 178/18 |
| 4,554,409 | 11/1985 | Mitsui et al. | 178/19 |
| 4,570,149 | 2/1986 | Thornburg et al. | 338/114 |
| 4,582,955 | 4/1986 | Blesser | 178/19 |
| 4,595,913 | 6/1986 | Aubuchon | 340/365 C |
| 4,616,107 | 10/1986 | Abe et al. | 178/18 |
| 4,639,720 | 1/1987 | Rympalski et al. | 340/712 |
| 4,672,154 | 6/1987 | Rodgers et al. | 178/18 |
| 4,680,430 | 7/1987 | Yoshikawa et al. | 178/19 |
| 4,686,332 | 8/1987 | Greanias et al. | 178/19 |
| 4,733,222 | 3/1988 | Evans | 340/365 |
| 4,734,685 | 3/1988 | Watanabe | 340/710 |
| 4,736,191 | 4/1988 | Matzke et al. | 340/365 C |
| 4,758,690 | 7/1988 | Kimura | 178/19 |
| 4,766,423 | 8/1988 | Ono et al. | 340/709 |
| 4,788,385 | 11/1988 | Kimura | 178/18 |
| 4,794,208 | 12/1988 | Watson | 178/19 |
| 4,820,886 | 4/1989 | Watson | 178/19 |
| 4,853,498 | 8/1989 | Meadows et al. | 178/19 |
| 4,918,262 | 4/1990 | Flowers et al. | 178/18 |
| 4,922,061 | 5/1990 | Meadows et al. | 178/19 |
| 4,988,982 | 1/1991 | Rayner et al. | 340/706 |
| 5,016,008 | 5/1991 | Gruaz et al. | 341/33 |
| 5,120,907 | 6/1992 | Shimbori et al. | 478/18 |
| 5,149,919 | 9/1992 | Greanias et al. | 178/19 |
| 5,239,140 | 8/1993 | Kuroda et al. | 178/18 |
| 5,270,711 | 12/1993 | Knapp | 341/34 |

OBJECT POSITION DETECTOR

CROSS-REFERENCE TO RELATED APPLICATION

This is a file-wrapper continuation of patent application Ser. No. 07/895,934, filed Jun. 8, 1992 now abandoned.

BACKGROUND OF THE INVENTION

1. Field of the Invention

The present invention relates to object position sensing transducers and systems. More particularly, the present invention relates to object position sensors useful in applications such as cursor movement for computing devices and other applications.

2. The Prior Art

Numerous devices are available or have been proposed for use as object position detectors for use in computer systems and other applications. The most familiar of such devices is the computer "mouse". While extremely popular as a position indicating device, a mouse has mechanical parts and requires a surface upon which to roll its position ball. Furthermore, a mouse usually needs to be moved over long distances for reasonable resolution. Finally, a mouse requires the user to lift a hand from the keyboard to make the cursor movement, thereby upsetting the prime purpose, which is usually typing on the computer keyboard.

Trackball devices are similar to mouse devices. A major difference, however is that, unlike a mouse device, a trackball device does not require a surface across which it must be rolled. Trackball devices are still expensive, have moving parts, and require a relatively heavy touch as do the mouse devices. They are also large in size and doe not fit well in a volume sensitive application like a laptop computer.

There are several available touch-sense technologies which may be employed for use as a position indicator. Resistive-membrane position sensors are known and used in several applications. However, they generally suffer from poor resolution, the sensor surface is exposed to the user and is thus subject to wear. In addition, resistive-membrane touch sensors are relatively expensive. A one-surface approach requires a user to be grounded to the sensor for reliable operation. This cannot be guaranteed in portable computers. An example of a one-surface approach is the UnMouse product by MicroTouch, of Wilmington, Mass. A two-surface approach has poorer resolution and potentially will wear out very quickly in time.

Surface Acoustic Wave (SAW) devices have potential use as position indicators, However, this sensor technology is expensive and is not sensitive to light touch. In addition, SAW devices are sensitive to residue buildup on the touch surfaces and generally have poor resolution.

Strain gauge or pressure plate approaches are an interesting position sensing technology, but suffer from several drawbacks. This approach may employ piezo-electric transducers. One drawback is that the piezo phenomena is an AC phenomena and may be sensitive to the user's rate of movement. In addition, strain gauge or pressure plate approaches are a somewhat expensive because special sensors are required.

Optical approaches are also possible but are somewhat limited for several reasons. All would require light generation which will require external components and increase cost and power drain. For example, a "finger-breaking" infra-red matrix position detector consumes high power and suffers from relatively poor resolution.

BRIEF DESCRIPTION OF THE INVENTION

The present invention comprises a position-sensing technology particularly useful for applications where finger position information is needed, such as in computer "mouse" or trackball environments. However the position-sensing technology of the present invention has much more general application than a computer mouse, because its sensor can detect and report if one or more points are being touched. In addition, the detector can sense the pressure of the touch.

There are at least two distinct embodiments of the present invention. Both embodiments of the present invention include a sensor comprising a plurality of spaced apart generally parallel conductive lines disposed on a first surface.

According to a first embodiment of the present invention, referred to herein as a "finger pointer" embodiment, a position sensing system includes a position sensing transducer comprising a touch-sensitive surface disposed on a substrate, such as a printed circuit board, including a matrix of conductive lines. A first set of conductive lines runs in a first direction and is insulated from a second set of conductive lines running in a second direction generally perpendicular to the first direction. An insulating layer is disposed over the first and second sets of conductive lines. The insulating layer is thin enough to promote significant capacitive coupling between a finger placed on its surface and the first and second sets of conductive lines.

Sensing electronics respond to the proximity of a finger to translate the capacitance changes between the conductors caused by finger proximity into position and touch pressure information. Its output is a simple X, Y and pressure value of the one object on its surface. The matrix of conductive lines are successively scanned, one at a time, with the capacitive information from that scan indicating how close a finger is to that node. That information provides a profile of the proximity of the finger to the sensor in each dimension. The centroid of the profile is computed with that value being the position of the finger in that dimension. The profile of position is also integrated with that result providing the Z (pressure) information. The position sensor of the first embodiment of the invention can only detect the position of one object on its sensor surface. If more than one object is present, the position sensor of this embodiment tries to compute the centroid position of the combined set of objects.

According to a second embodiment of the present invention, a position sensing system includes a position sensing transducer as described herein. Sensing electronics respond to the proximity of a finger to translate the capacitance changes between the conductors running in one direction and those running in the other direction caused by finger proximity into position and touch pressure information. The sensing electronics of the second embodiment of the invention saves information for every node in its sensor matrix and can thereby give the full X/Y dimension picture of what it is sensing. It thus has much broader application for richer multi-dimensional sensing than does the first "finger pointer" embodiment. In this embodiment, referred to herein as the "position matrix" approach, the x,y coordinate information can be used as input to a on-chip neural network processor. This allows an operator to use multiple fingers, coordinated gestures, etc. for even more complex interactions.

DETAILED DESCRIPTION OF A PREFERRED EMBODIMENT

Figure 1A:
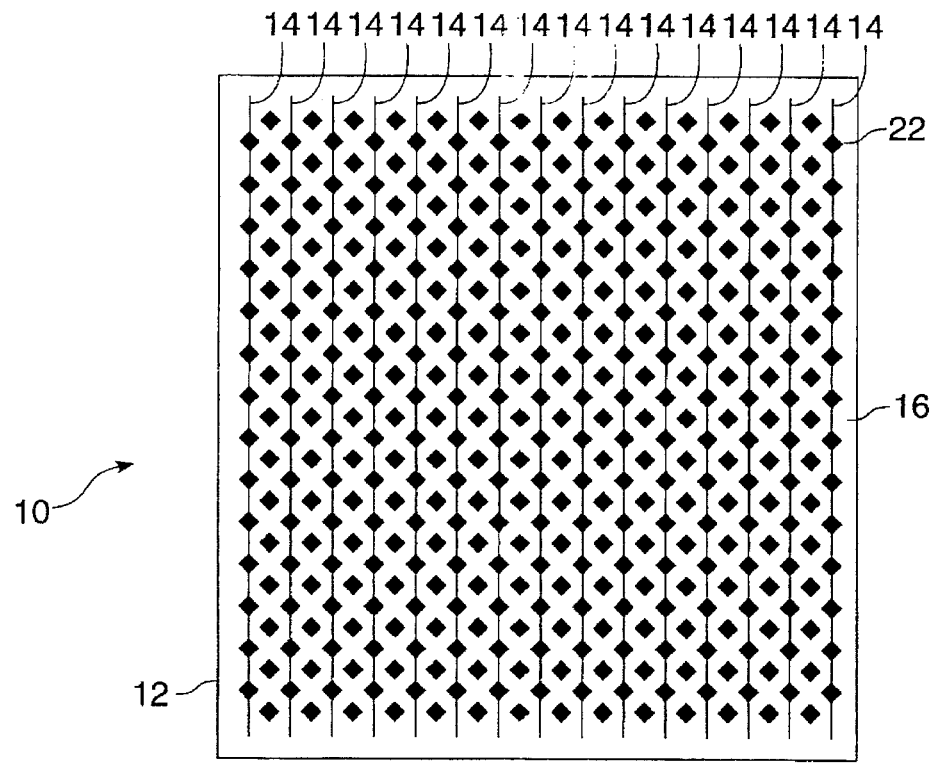
FIG. 1a is a top view of an object position sensor transducer according to a presently preferred embodiment of the invention showing the object position sensor surface layer including a top conductive trace layer and conductive pads connected to a bottom trace layer.
Figure 1B:
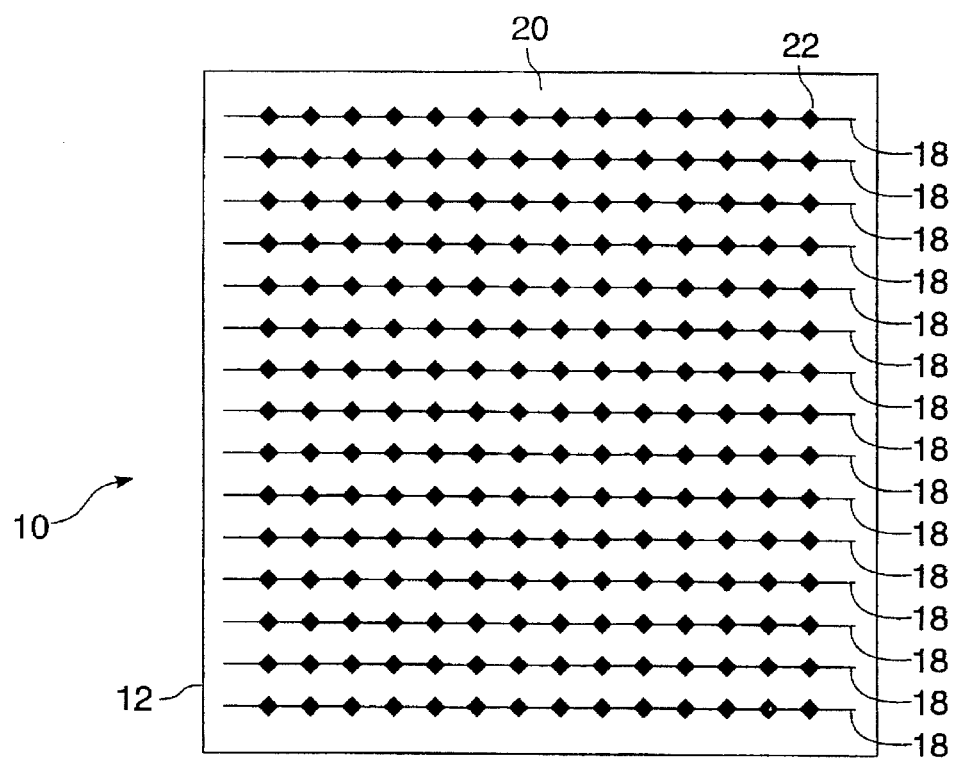
FIG. 1b is a bottom view of the object position sensor transducer of FIG. 1 a showing the bottom conductive trace layer.
Figure 1C:
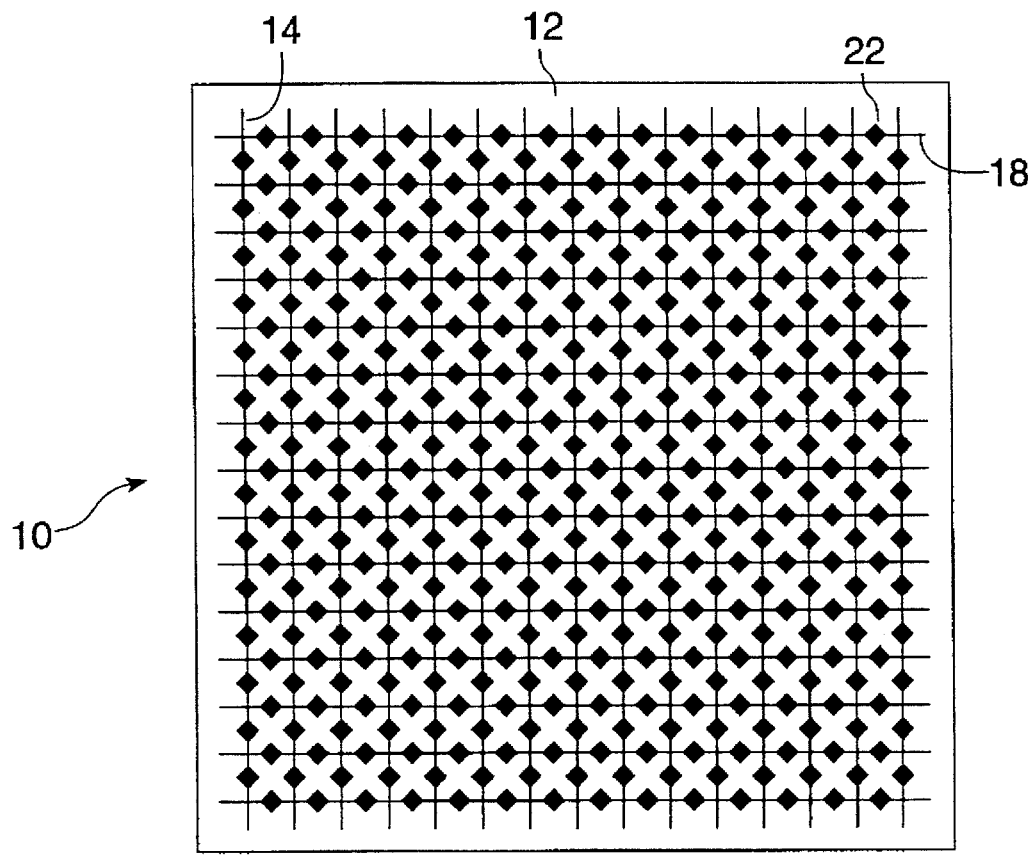
FIG. 1c is a composite view of the object position sensor transducer of FIGS. 1a and 1b showing both the top and bottom conductive trace layers.
Figure 1D:
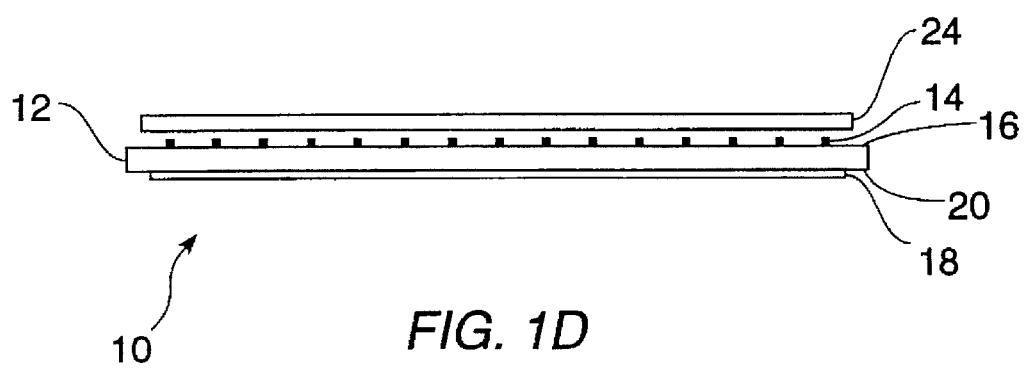
FIG. 1d is a cross-sectional view of the object position sensor transducer of FIGS. 1a–1c.

Those of ordinary skill in the art will realize that the following description of the present invention is illustrative only and not in any way limiting. Other embodiments of the invention will readily suggest themselves to such skilled persons.

The present invention brings together in combination a number of unique features which allow for new applications not before possible. Because the object position sensor of the present invention has very low power requirements, it is beneficial for use in battery operated or low power applications such as lap top or portable computers. It is also a very low cost solution, has no moving parts (and is therefore virtually maintenance free), and uses the existing printed circuit board traces for sensors. The sensing technology of the present invention can be integrated into a computer motherboard to even further lower its cost in computer applications. Similarly, in other applications the sensor can be part of an already existent circuit board.

Because of its small size and low profile, the sensor technology of the present invention is useful in lap top or portable applications where volume is important consideration. The sensor technology of the present invention requires circuit board space for only a single sensor interface chip that can interface directly to a microprocessor, plus the area needed on the printed circuit board for sensing.

The sensor material can be anything that allows creation of a conductive X/Y matrix of pads. This includes not only standard PC board, but also flexible PC board, conductive elastomer materials, and piezo-electric Kynar plastic materials. This renders it useful as well in any portable equipment application or in human interface where the sensor needs to be molded to fit within the hand.

The sensor can be conformed to any three dimensional surface. Copper can be plated in two layers on most any surface contour producing the sensor. This will allow the sensor to be adapted to the best ergonomic form needed for a particular application. This coupled with the "light-touch" feature will make it effortless to use in many applications. The sensor can also be used in an indirect manner, i.e. it can have a conductive foam over the surface and be used to detect any object (not just conductive) that presses against it's surface.

Small sensor areas are practical, i.e., a presently conceived embodiment takes about 1.5"×1.5" of area, however those of ordinary skill in the art will recognize that the area is scalable for different applications. The matrix area is scaleable by either varying the matrix trace spacing or by varying the number of traces. Large sensor areas are practical where more information is needed.

Besides simple X and Y position information, the sensor technology of the present invention also provides finger pressure information. This additional dimension of information may be used by programs to control special features such as "brush-width" modes in Paint programs, special menu accesses, etc., allowing provision of a more natural sensory input to computers.

The user will not even have to touch the surface to generate the minimum reaction. This feature can greatly minimize user strain and allow for more flexible use.

The sense system of the present invention depends on a transducer device capable of providing position and pressure information regarding the object contacting the transducer. Referring first to FIGS. 1a–1d, top, bottom, composite, and cross-sectional views, respectively, are shown of a presently-preferred touch sensor array for use in the present invention. Since capacitance is exploited by this embodiment of the present invention, the sensor surface is designed to maximize the capacitive coupling between top (X) trace pads to the bottom (Y) trace pads in a way that can be maximally perturbed and coupled to a finger or other object placed above the surface.

A presently preferred sensor array 10 according to the present invention comprises a substrate 12 including a set of first conductive traces 14 disposed on a top surface 16 thereof and run in a first direction to comprise rows of the sensor array 10. A set of second conductive traces 18 are disposed on a bottom surface 20 thereof and run in a second direction preferably orthogonal to the first direction to form the columns of the sensor array 10. The sets of first and second conductive traces 14 and 18 are alternately in contact with periodic sense pads 22 comprising enlarged areas, shown as diamonds in FIGS. 1a–1c. While sense pads 22 are shown as diamonds in FIGS. 1a–1c, any shape, such as circles, which allows close packing of the sense pads 22, is equivalent for purposes of this invention.

The number and spacing of these sense pads 22 depends upon the resolution desired. For example, in an actual embodiment constructed according to the principles of the present invention, a 0.10 inch center-to-center diamond-shaped pattern of sense pads disposed along a matrix of 15 rows and 15 columns of conductors is employed. Every other sense pad 22 in each direction in the pad pattern is connected to sets of first and sceond conductive traces 14 and 18 on the top and bottom surfaces 16 and 20, respectively of substrate 12.

Substrate 12 may be a printed circuit board, a flexible circuit board or any of a number of available circuit interconnect technology structures. Its thickness is unimportant as long as contact may be made therethrough from the set of second conductive traces 18 to their sense pads 22 on the top surface 16. The printed circuit board comprising substrate 12 can be constructed using standard industry techniques. Board thickness is not important. Pad-to-pad spacing should preferably be minimized to something in the range of about 15 mils or less. Connections from the sense pads 22 to the set of second traces 18 may be made employing standard plated-through hole techniques well known in the printed circuit board art.

An insulating layer 24 is disposed over the sense pads 22 on top surface 16 to insulate a human finger or other object therefrom. Insulating layer 24 is preferably a thin layer (i.e., approximately 5 mils) to keep capacitive coupling large and may comprise a material, such as mylar, chosen for its protective and ergonomic characteristics.

There are two different capacitive effects taking place when a finger approaches the sensor array 10. The first capacitive effect is trans-capacitance, or coupling between sense pads 22, and the second capacitive effect is self-capacitance (ground capacitance), or coupling to earth-ground. Sensing circuitry is coupled to the sensor array 10 of the present invention and responds to changes in either or both of these capacitances. This is important because the relative sizes of the two capacitances change greatly depending on the user environment. The ability of the present invention to detect changes in both self capacitance and trans-capacitance results in a very versatile system having a wide range of applications.

According to a first embodiment of the invention, a position sensor system including sensor array 10 and associated touch detector circuitry will detect a finger position on a matrix of printed circuit board traces via the capacitive effect of finger proximity to the sensor array 10. The position sensor system will report the X, Y position of a finger placed near the sensor array 10 to much finer resolution than the spacing between the sets of first and second traces 14 and 18. The position sensor according to this embodiment of the invention will also report a Z value proportional to the outline of that finger and hence indicative of the pressure with which the finger contacts the surface of insulating layer 24 over the sensor array 10.

According to a presently preferred embodiment of the invention, a very sensitive, light-touch detector circuit may be provided using adaptive analog VLSI techniques. The circuit of the present invention is very robust and calibrates out process and systematic errors. The detector circuit of the present invention will process the capacitive input information and provide digital information to a microprocessor.

According to this embodiment of the invention, sensing circuitry is contained on a single sensor processor integrated circuit chip. The sensor processor chip can have any number of X and Y "matrix" inputs. The number of X and Y inputs does not have to be equal. The Integrated circuit has a digital bus as output. In the illustrative example disclosed in FIGS. 1a–1d herein, the sensor array 10 has 15 traces in both the Y and Y directions. The sensor processor chip thus has 15 X inputs and 15 Y inputs.

The X and Y matrix nodes are successively scanned, one at a time, with the capacitive information from that scan indicating how close a finger is to that node. The scanned information provides a profile of the finger proximity in each dimension. According to this aspect of the present invention, the profile centroid is derived in both the X and Y directions and is the position in that dimension. The profile curve of proximity is also integrated to provide the Z information.

Figure 2:
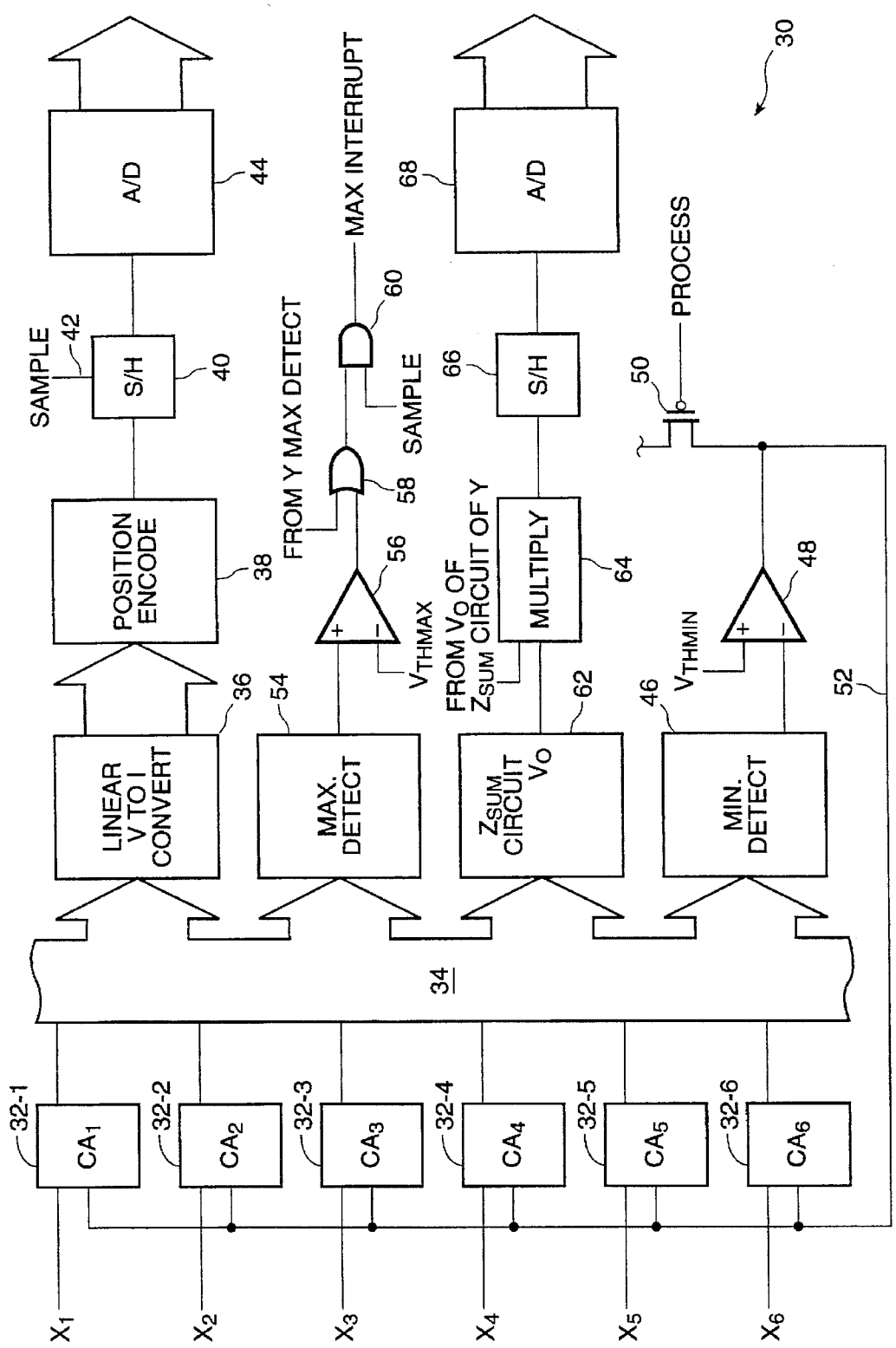
FIG. 2 is a block diagram of sensor decoding electronics which may be used with the sensor transducer in accordance with a first embodiment of the present invention.

Referring now to FIG. 2, a block diagram of presently preferred sensing circuitry 30 for use according to the present invention is shown. The sensing circuitry 30 of this embodiment employs a driving-point capacitance measurement for each X and Y line in the sensor array 10. The block diagram of FIG. 2 illustrates the portion of the sensing circuitry 30 for developing signals from one direction (shown as X in the matrix). The circuitry for developing signals from the other direction in the matrix is identical and its interconnection to the circuitry shown in FIG. 2 will be disclosed herein. The sensing circuitry 30 of FIG. 2 illustratively discloses an embodiment in which information from six X matrix lines X1 . . . X6 are processed. Those of ordinary skill in the art will recognize that this embodiment is illustrative only, and that actual embodiments fabricated according to the present invention may employ an arbitrarily sized matrix, limited only by technology constraints.

The driving-point capacitance measurement for each of X lines X1 . . . X6 is derived from an integrating charge amplifier circuit. These circuits are shown in block form at reference numerals 32-1 through 32-6. The function of each of integrating charge amplifier 32-1 through 32-6 is to develop an output voltage proportional to the capacitance sensed on its corresponding X matrix line.

The driving-point capacitance measurement is made for all X (row) first conductive traces 14 and all Y (column) second conductive traces 18 in the sensor matrix array 10. A profile of the finger proximity mapped into the X and Y dimension is generated from the driving-point capacitance measurement data. This profile is then used to determine a centroid in both dimensions, thereby determining the X and Y position of the finger.

The output voltages of integrating charge amplifier 32-1 through 32-6 are utilized by several other circuit elements and are shown for convenience in FIG. 2 as distributed by bus 34. Bus 34 is a six conductor bus, and those of ordinary skill in the art will recognize that each of its conductors comprises the output of one of integrating charge amplifiers 32-1 through 32-6.

The first of circuit elements driven by the outputs of integrating charge amplifier circuits 32-1 through 32-6 is linear voltage-to-current converter 36. The function of linear voltage-to-current converter 36 is to convert the output voltages of integrating charge amplifiers 32-1 through 32-6 to currents for subsequent processing.

The current outputs from linear voltage-to-current converter 36 are presented as inputs to X position encode circuit 38. The function of X position encode circuit 38 is to convert the input information into a signal representing object proximity in the X dimension of the sensor array 10. According to a presently preferred embodiment of the invention, this circuit will provide a scaled weighted mean (centroid) of the set of input currents. The result is a circuit which is a linear position encoder, having an output voltage which varies between the power supply rails. Because it is a weighted mean, it averages all current inputs and can in turn generate an output voltage which represents an X position with a finer resolution than the spacing of the X matrix grid spacing.

The output voltage of X position encode circuit 38 is presented to sample/hold circuit 40, the output of which, as is well known in the art, either follows the input or holds a value present at the input depending on the state of its control input 42. The structure and operation of sample/hold circuits are well known in the art.

The output of sample/hold circuit 40 drives the input of analog-to-digital (A/D) converter 44. The output of A/D converter 44 is a digital value proportional to the position of the object in the X dimension of the sensor array 10.

While the portion of the circuit described so far is useful for providing a digital signal indicating object position in one dimension, the addition of further circuit elements yields a more useful device which is more immune to noise, detects and subtracts the no-object-proximate signal from the outputs of the sensors, and provides threshold detection of an approaching object.

The first of these additional circuit elements is minimum detector circuit 46. The function of minimum detector circuit 46 is to determine the level of signal representing ambient no-object-proximate to the sensor array 10 and to provide a signal which may be fed back to integrating charge amplifiers 32-1 through 32-6 to control their output voltages to effectively zero out the outputs of the integrating charge amplifiers 32-1 through 32-6 under the ambient condition. The output of minimum detector circuit 46 is a voltage. This voltage is compared in operational amplifier 48 with an adjustable voltage representing a minimum threshold value $V_{Thmin}$. Through feedback to the integrating charge amplifiers 32-1 through 32-6, operational amplifier 48 adjusts its output to balance the output voltage of minimum detector circuit 46 with the voltage $V_{Thmin}$. Feedback is controlled by P-channel MOS transistor 50, which allows the feedback to operate only when the PROCESS signal is active.

Figure 3A:
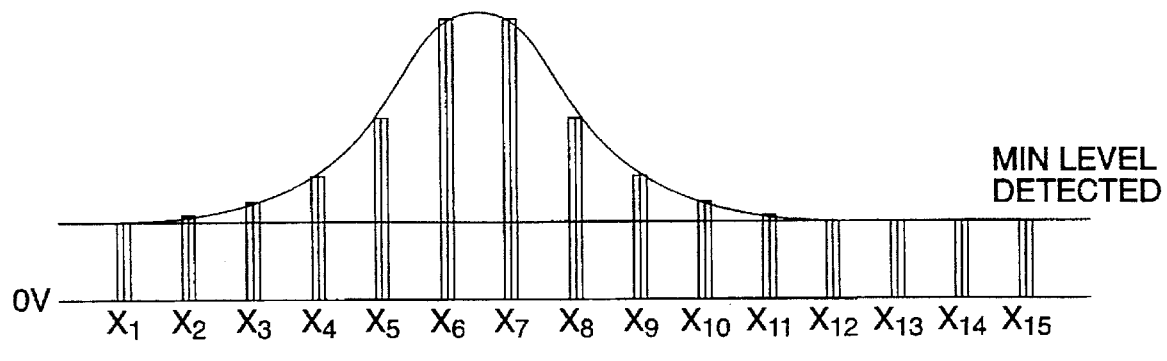
FIGS. 3a and 3b are graphs of output voltage versus matrix conductor position which illustrate the effect of the minimum detector.
Figure 3B:
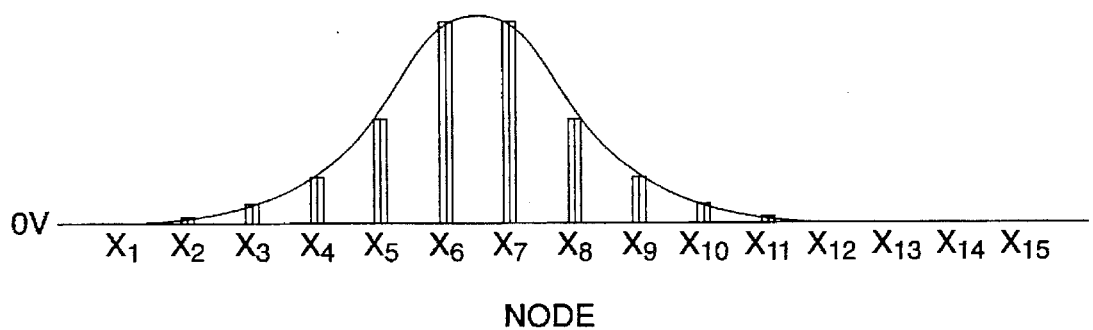

FIGS. 3a and 3b are graphs of output voltage versus matrix conductor position which illustrate the effect of the minimum detector circuit 46. In order to better illustrate the effect of offset cancellation, FIGS. 3a and 3b show the outputs of integrating charge amplifiers from a fifteen row matrix, rather than from a six row matrix as is implied by FIG. 2. FIG. 3a shows the offset component of the voltage outputs of integrating charge amplifiers without the operation of minimum detector circuit 46, and FIG. 3b shows the voltage outputs with the offset having been zeroed out by the feedback loop comprising minimum detector circuit 46, P-channel MOS transistor 50, and feedback conductor 52.

Another additional circuit component is maximum detector circuit 54. The function of maximum detector circuit 54, working in co-operation with amplifier 56, OR gate 58, and AND gate 60 is to provide a MAX INTERRUPT signal. The MAX INTERRUPT signal alerts the microprocessor controlling the object sensor system of the present invention that an object is approaching the sensor array 10. The amplifier 56 acts as a comparator which trips if the output voltage from maximum detector circuit 54 exceeds the threshold set by the voltage $V_{Thmax}$. When the output voltage from maximum detector circuit 54 exceeds the threshold, or the output voltage from the corresponding Y maximum detector (not shown) exceeds the threshold set for its corresponding amplifier, the output of OR gate 58 becomes true. That and a true SAMPLE signal at the second input of AND gate 60 causes a true MAX INTERRUPT signal at its output.

The Z Sum circuit 62 produces an output which is proportional to the pressure with which a finger is pressing on the sensor. This is done In both the X and Y dimensions by effectively integrating the areas under the curves of FIG. 3b. Referring again to FIG. 3b for illustration purposes, it can be seen that the width of the contact area in the X dimension of the sensor array 10 is from about $X_2$ to $X_{10}$.

According to a presently preferred embodiment of the invention, Z Sum circuit 62 is configured to produce an output voltage $V_O$. Output voltage $V_O$ is a scaled function of all the input voltages.

Since the outputs of the Z Sum circuits 62 in both the X and Y directions are proportional to the width of the pointing finger or other flexible object in the two dimensions of the sensor array 10, the area of the finger or other flexible object is a reliable measure of the pressure with which the finger is contacting the surface of the sensor array 10. The area may be calculated by multiplier circuit 64, having the output of the Z Sum circuit 62 in the X dimension as one of its inputs and the output of the Z Sum circuit 62 in the Y dimension as the other one of its inputs.

A presently preferred embodiment of multiplier circuit 64 takes two analog voltage inputs and performs an analog computation on those voltages to create a voltage output which is proportional to the product of the two input voltages. As shown in FIG. 2, a first input term is the output voltage of the X dimension Z Sum circuit 62 and a second input term is the output of the Y dimension Z Sum circuit (not shown). Those of ordinary skill in the art will recognize that since multiplication is commutative process and since the multiplier inputs are symmetrical, it does not matter which of the X and Y Z sum circuits 62 contributes the first input term and which contributes the second input term.

The output of multiplier circuit 64 is a voltage and drives a sample/hold circuit 66. Sample/hold circuit 66 may be identical to sample/hold circuit 40 and may be driven by the same SAMPLE signal which drives sample/hold circuit 40.

The output of sample/hold circuit 66 drives the input of analog-to-digital (A/D) converter 68. A/D converter 68 may be identical to A/D converter 44. The output of A/D converter 68 is a digital value proportional to the pressure with which the finger (or other flexible object) is contacting the surface of sensor array 10.

The object position sensor system of the present invention may be operated under the control of a microprocessor which provides the timing and other control signals necessary to operate the system. For example, the MAX INTERRUPT signal from the output of AND gate 60 may be used to interrupt the microprocessor and invoke an object sensing routine. The particular timing and control signals employed by any system constructed according to the present invention will vary according to the individual design. The following is therefore an illustrative disclosure providing circuit details of illustrative circuit components of a presently preferred system according to the present invention and including disclosure of typical timing and control signals for operating these circuits.

Figure 4:
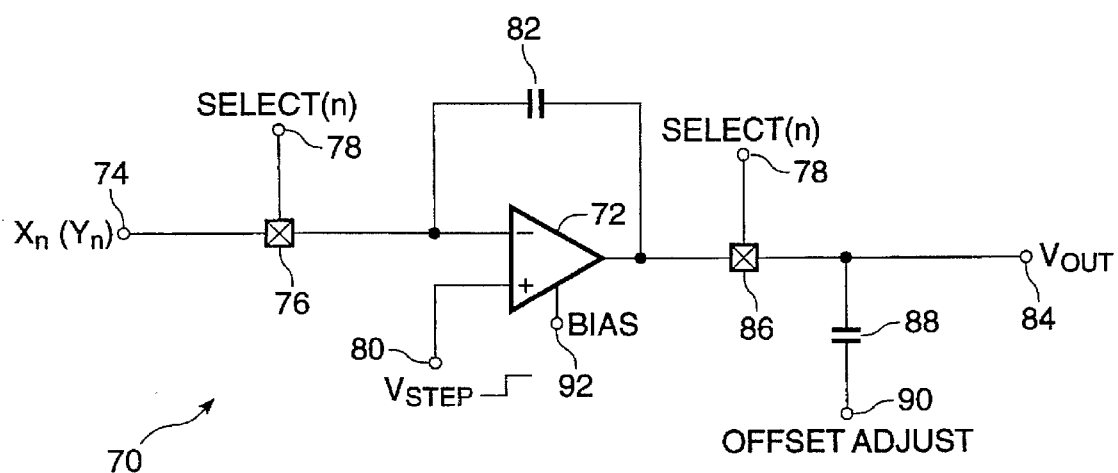
FIG. 4 is a simplified schematic diagram of an integrating charge amplifier circuit suitable for use in the present invention.

Referring now to FIG. 4, a simplified schematic diagram of an integrating charge amplifier 70 operating in a driving-point capacitance measuring mode suitable for use in the present invention is shown. Integrating charge amplifier 70 is derived from the common integrating amplifier seen in the literature, for example in Gregorian and Temes, Analog MOS Integrated Circuits, John Wiley & Sons (1986) pp. 270–271; Haskard and May, Analog VLSI Design, Prentice Hall (1988), pp. 105–106, and is built around amplifying element 72, which may comprise a common transconductance amplifier as described in Mead, Analog VLSI and Neural Systems, Addison-Wesley (1989) pp. 70–71. The inverting input of amplifying element 72 is connected to an input node 74 through a switch 76 controlled by a SELECT (n) node 78. The input node 74 is connected to one of the lines in the sensor array 10 of FIG. 1. While the disclosure herein illustrates the use of an integrating charge amplifier connected to a row line of the sensor array, those of ordinary skill in the art will recognize that the operation of the integrating charge amplifiers connected to the column lines of the sensor array is identical.

The non-inverting input of amplifying element 72 is connected to a Voltage step input node 80. A capacitor 82 is connected as an integrating feedback element between the output and inverting input of amplifying element 72. According to a presently preferred embodiment of the invention, capacitor 82 may have a capacitance of about 10 pF.

The output of amplifying element 72 is connected to an output node 84 through a switch 86. Switch 86 is controlled by the SELECT(n) node 78 which also controls switch 76. A capacitor 88, which may have a capacitance of about 3 pF, is connected between output node 84 and an offset adjust node 90. Those of ordinary skill in the art will recognize that switches 76 and 86 may comprise common CMOS pass gates, each including an N-channel and a P-channel MOS transistor connected in parallel with their gates driven by complimentary signals. Those of ordinary skill in the art will recognize that the combination of switch 86 and capacitor 88 form a simple sample/hold circuit the offset of which may be adjusted when the switch 86 is in its off position via the voltage on offset adjust node 90.

Amplifying element 72 also includes a BIAS input node 92, which may be connected to an on-chip current bias reference which may be used for all of the integrating charge amplifiers on the chip.

A driving-point capacitance measurement is made by closing switches 76 and 86 and stepping, by an amount Vstep, the input voltage on Voltage step input node 80 at the non-inverting input of amplifying element 72. Because of the negative feedback arrangement, the output of amplifying element 72 will then move to force the voltage at its inverting input to match the voltage at its non-inverting input. The result is that the voltage at the output node 84 changes to a value that injects enough charge into capacitor 82 to match the charge that is injected into the capacitance on the sensor array 10 line connected to input node 74. This change may be expressed as:

$$V_{out} = V_{step} * (1 + C_{matrix}/C_{82})$$

where $V_{out}$ is the output voltage, $C_{matrix}$ is the capacitance on the row or column line of the sensor array 10 to which input node 74 is connected and $C_{82}$ is capacitor 82.

When a finger approaches the sensor array 10, $C_{matrix}$ will increase in magnitude. The result is that Vout will also increase in a driving-point capacitance measurement made as the finger approaches. $V_{out}$ is proportional to the proximity of a finger (conductive object) to the sensor array 10 line connected to input node 74. As described above, the driving-point capacitance measurement gives an output voltage change that is directly proportional to the sensor array 10 capacitance that is to be measured.

Subtracting the $V_{out}$ value with no object present from the $V_{out}$ value where there is an object present results in a $V_{out}$ difference that is proportional to the change in capacitance at the row line of the sensor array 10 to which input node 74 is connected. Thus:

$$V_{out(final)} = V_{out\ (with\ finger)} - V_{out\ (no\ object)}$$

$$V_{out\ (with\ finger)} = V_{STEP} * (1 + ((C_{no\ object} + C_{finger})/C_{82}))$$

$$V_{out\ (no\ object)} = V_{STEP} * (1 + (C_{no\ object}/C_{82}))$$

$$V_{out\ (final)} = V_{STEP}\ (C_{finger}/C_{82})$$

According to a presently preferred embodiment of the invention, this subtraction operation may be performed by applying an offset adjust voltage to capacitor 88 at offset adjust node 90. This voltage may be presented to the amplifier circuit via line 52 (FIG. 2) and is controlled by the Minimum Detect circuit 46 when the PROCESS control line is active. The offset adjust node 90 subtracts the "no object voltage" from the output node 84 and leaves an output voltage directly proportional to the change of the capacitance at the row line of the sensor array 10 to which input node 74 is connected caused by the approaching object.

To operate the object position sensing system of the present invention, the integrating charge amplifiers 70 are selected one at a time using their select nodes 78. This closes both switches 76 and 86 to start the integrator and to start sampling the results of this operation. The voltage at the Voltage step input node 80 is stepped, and the circuit is allowed to settle. After sufficient settling time the select signal is disabled, switches 76 and 86 are opened and the sampled result is left stored at the output node 84 on capacitor 88.

After all of the row and column lines of the sensor array 10 have been scanned, a PROCESS cycle takes place, and the minimum detector circuits 46 in both the X and Y dimensions adjust the output voltages on capacitors 88 in all integrating charge amplifiers 70 via the common input line 52 to all amplifiers.

Figure 5:
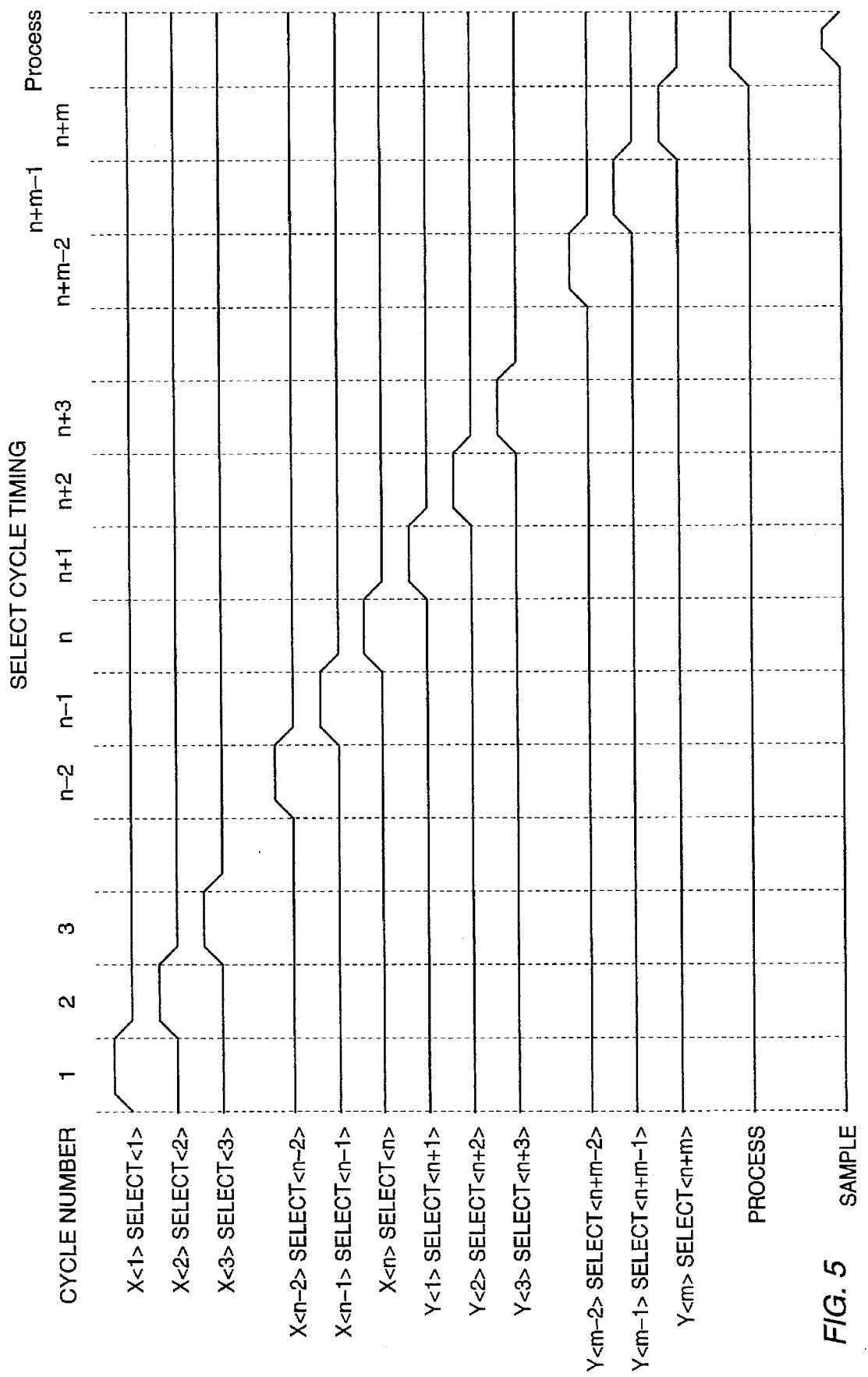
FIG. 5 is a timing diagram showing the relative timing of control signals used to operate the object position sensor system of the present invention with an integrating charge amplifier as shown in FIG. 4.

Referring now to FIG. 5 a timing diagram shows the relationship between the timing and control signals used to operate the object position sensor system of the present invention utilizing the integrating charge amplifier 70 of FIG. 4. In the embodiment illustrated in FIG. 5, first all X and Y integrating charge amplifiers are sequentially selected, followed by a PROCESS signal and then a SAMPLE signal.

Figure 6A:
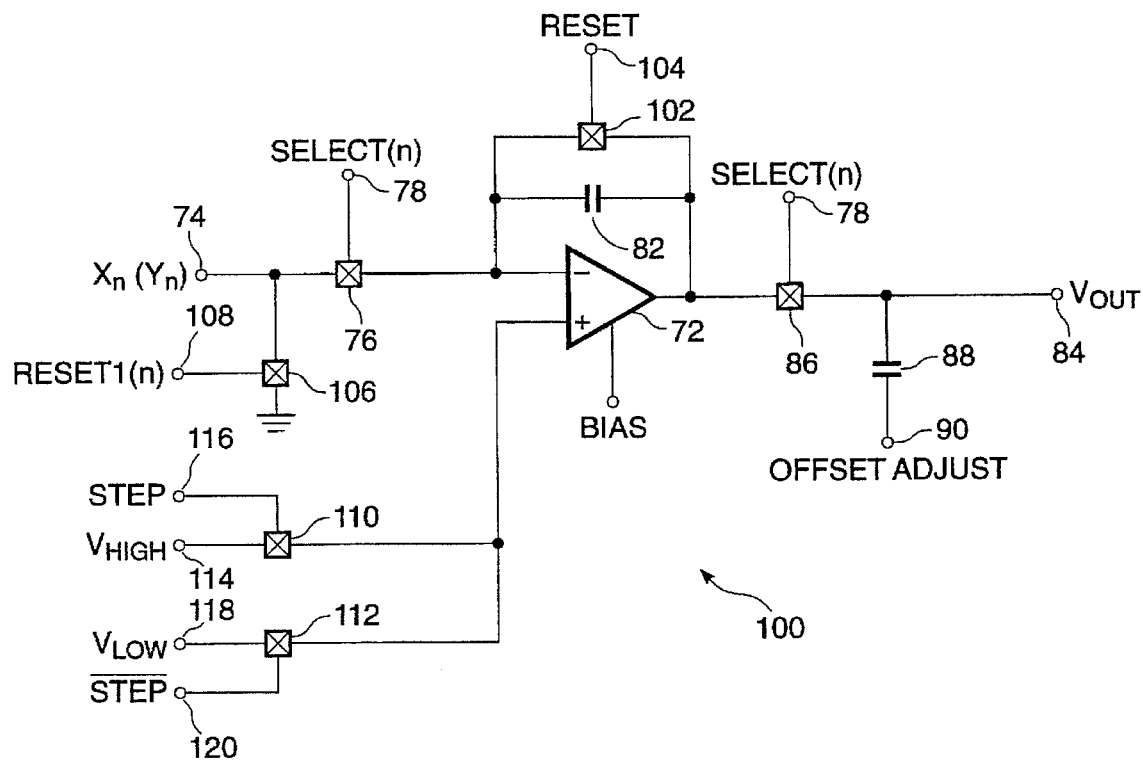
FIG. 6a is a schematic diagram of a first alternate embodiment of an integrating charge amplifier circuit suitable for use in the present invention including additional components to bring the circuit to equilibrium prior to integration measurement.

Additional components may be added to integrating charge amplifiers 70, largely to bring the circuits to equilibrium before the integration takes place. Referring now to FIG. 6a, in an alternate embodiment of an integrating charge amplifier 100, all components of the embodiment of FIG. 4 are present. In the embodiment of FIG. 6a, the portion of the cycle in which a global RESET node is true is used to equibrilate the circuit by discharging the integrating feedback capacitor 82 to zero volts. The voltage $V_{STEP}$ is then provided to the non-inverting input of the amplifying element 72 in a manner which allows easily controlled stepping between the two designated voltages, $V_{LOW}$ and $V_{HIGH}$.

The additional components in integrating charge amplifier 100 include a switch 102 connected across capacitor 82 connected to a RESET node 104 connected to all of the integrating charge amplifiers 100 in the system. When the RESET signal is true at the beginning of each scanning cycle, switch 102 turns on and discharges the capacitor 82 to zero volts.

A switch 106 is connected between the input node 74 and ground has a control element connected to a RESET1 (n) node 108. The RESET1 (n) node 108 is active for all integrating charge amplifiers except for the one selected by its SELECT(n) node to perform the driving-point impedance measurement. Its function is to discharge any voltage present on those nodes due to the capacitive coupling to the other nodes which have been driven by the scanning process and thereby eliminate or minimize the error which such voltages would introduce into the measurement process.

Finally, the $V_{STEP}$ voltage may be provided to the non-inverting input of amplifying element 72 by employing switches 110 and 112. Switch 110 is connected between a $V_{HIGH}$ voltage node 114 and the non-inverting input of amplifying element 72, and is controlled by a STEP node 116. Switch 112 is connected between a $V_{LOW}$ voltage node 118 and the non-inverting input of amplifying element 72, and is controlled by a $\overline{STEP}$ node 120. Switches 102, 106, 110, and 112 may comprise common CMOS pass gates.

Figure 6B:
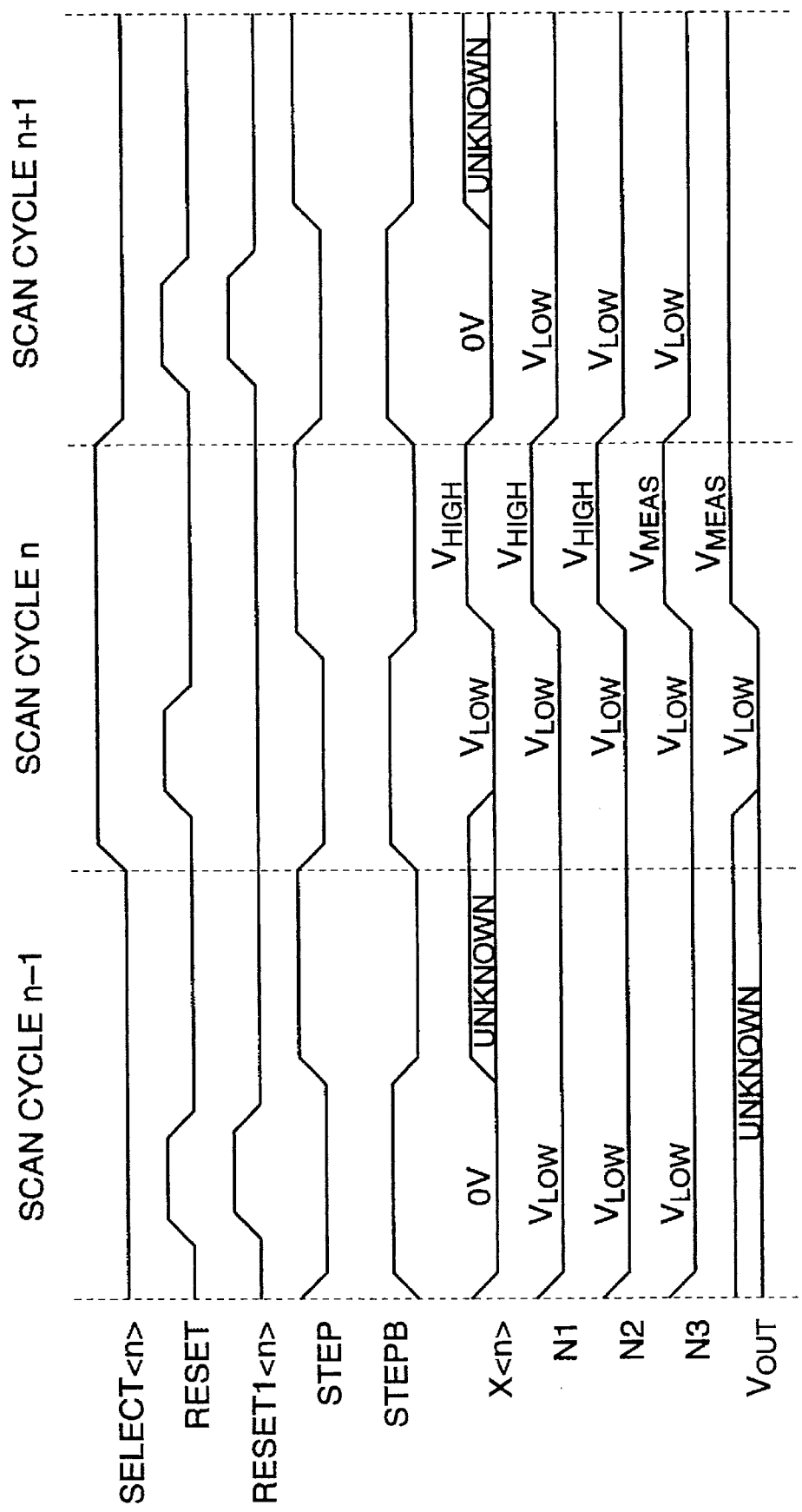
FIG. 6b is a timing diagram showing the control and timing signals used to drive the integrating charge amplifier of FIG. 6a and the response of various nodes in the amplifier to those signals.

Referring now to FIG. 6b, a timing diagram shows the relationships between the various control signals and the voltages present on selected nodes of the integrating charge amplifier 100 of FIG. 6a during scan cycles (n−1), (n), and (n+1). As can be seen from FIG. 6b, the global RESET signal at RESET node 104 discharges the capacitors 82 of all integrating charge amplifiers 100 in the system at the beginning of each scanning cycle. The RESET1(n) signal at RESET1(n) node 108 is coincident with the RESET signal during scanning cycles (n−1) and (n+1) but does not appear at the RESET1(n) node 108 of the integrating charge amplifier 100 which is making the driving-point capacitance measurement during scanning cycle (n). As those of ordinary skill in the art will readily appreciate from the description herein, the RESET1(n) signal for any integrating charge amplifier 100n may be generated by simple logic circuitry to implement the logic function RESET1(n)=RESET·$\overline{SELECT(n)}$.

FIG. 6b also shows the STEP and $\overline{STEP}$ signals drive the non-inverting input of amplifying element 72 first to $V_{LOW}$ and then to $V_{HIGH}$ during each scanning cycle. The signals N1, N2, and N3 represent the voltages present at the inverting input, the non-inverting input, and the output, respectively, of amplifying element 72. As can be seen from FIG. 6b, the voltage $V_{meas}$, the voltage of interest, remains at the output node of integrating charge amplifier 100 even after the end of scan cycle (n) in which it was developed.

Figure 7A:
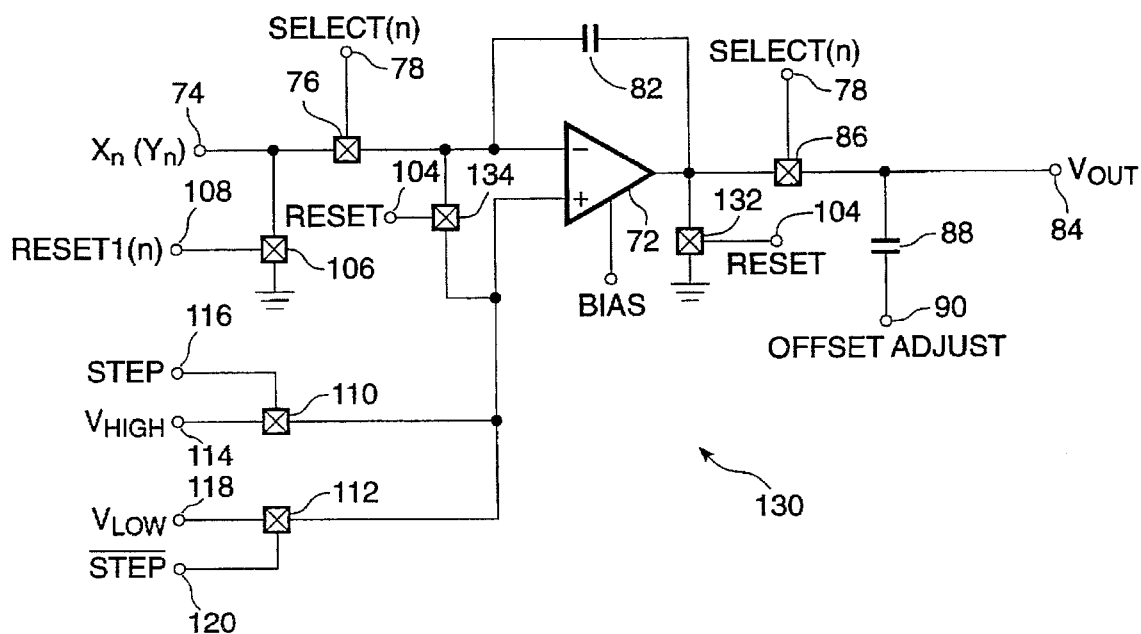
FIG. 7a is a schematic diagram of a second alternate embodiment of an integrating charge amplifier circuit suitable for use in the present invention including additional components to bring the circuit to equilibrium prior to integration measurement.

Referring now to FIG. 7a, an embodiment of an integrating charge amplifier 130 according to the present invention is an approach that provides a larger operating range for the integration. The embodiment of FIG. 7a is nearly identical in its structure and operation to the embodiment of FIG. 6a, except that instead of switch 102 acting to discharge capacitor 82 to zero volts when the RESET node 104 is true, switch 132, which may comprise a common CMOS pass gate, is used to force the output of amplifying element 72 to ground (zero volts) instead of to $V_{LOW}$ as in the embodiment of FIG. 6a. A switch 134, also controlled by RESET node 104, is used to short together the inverting and non-inverting inputs of amplifying element 72, forcing them both to an equilibrium voltage of $V_{LOW}$. In low power supply-voltage applications, such as found in notebook computers, this circuit increases the signal sensitivity by a factor of two.

Figure 7B:
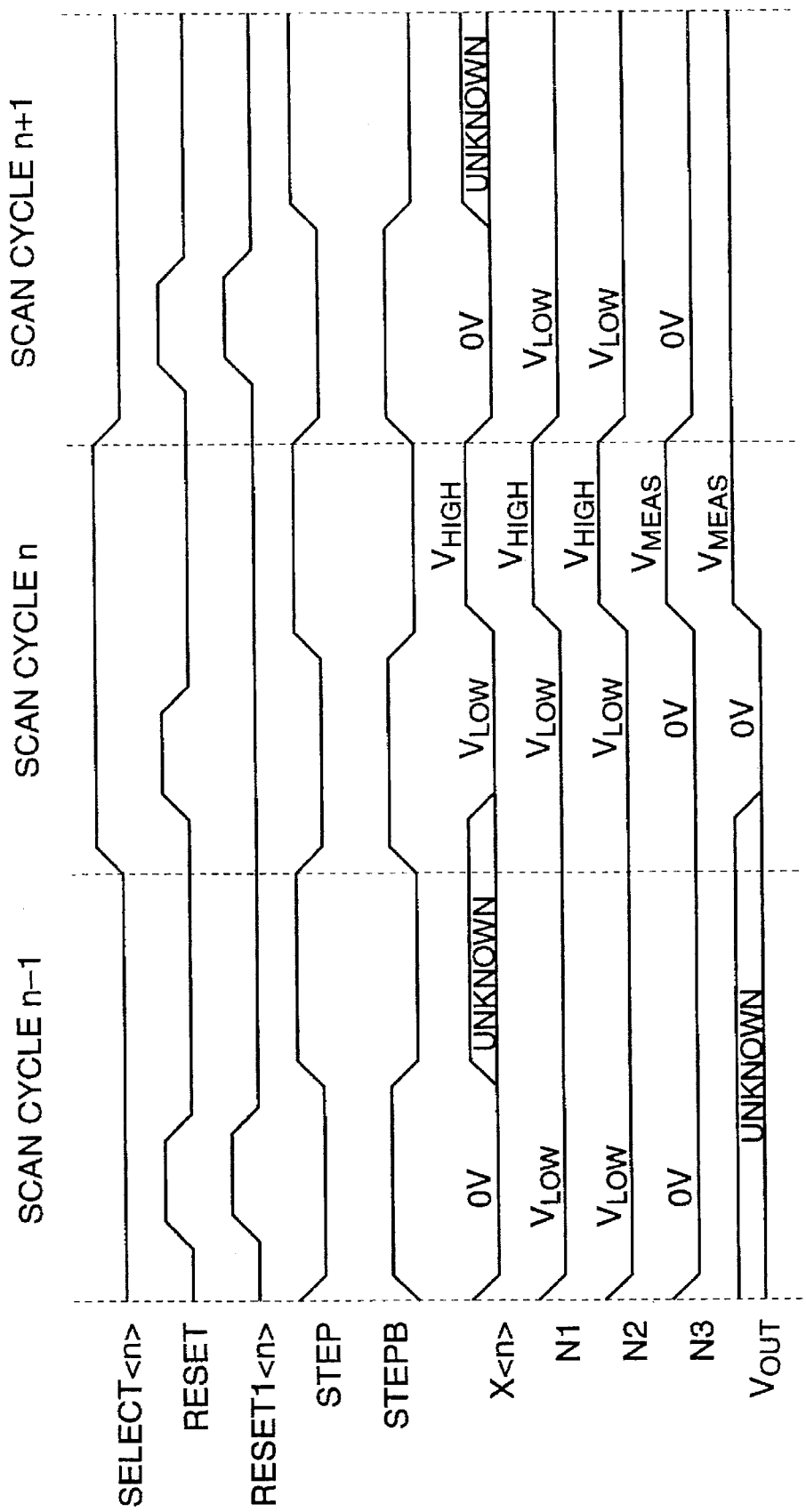
FIG. 7b is a timing diagram showing the control and timing signals used to drive the integrating charge amplifier of FIG. 7a and the response of various nodes in the amplifier to those signals.

FIG. 7b is a timing diagram which shows the relationships between the various control signals and the voltages present on selected nodes of the integrating charge amplifier circuit 130 of FIG. 7a during scan cycles (n−1), (n), and (n+1). As can be seen from FIG. 7b, the global RESET signal at node 104 forces the outputs of all integrating charge amplifiers 130 in the system to zero volts at the beginning of each scanning cycle. As in the embodiment of FIG. 7a, the RESET1(n) signal at RESET1(n) node 108 is coincident with the RESET signal during scanning cycles (n−1) and (n+1) but does not appear at the RESET1(n) node 108 of the integrating charge amplifier 130 which is making the driving-point capacitance measurement during scanning cycle (n).

Like the embodiment of FIG. 6a, in the embodiment of FIG. 7a the STEP and $\overline{STEP}$ signals drive the non-inverting input of amplifying element 72 first to $V_{LOW}$ and then to $V_{HIGH}$ during each scanning cycle. The signals N1, N2, and N3 represent the voltages present at the inverting input, the non-inverting input, and the output, respectively, of amplifying element 72. As can be seen from FIG. 7b, the voltage $V_{meas}$, the voltage of interest, remains at the output node of integrating charge amplifier 130 even after the end of scan cycle (n) in which it was developed.

Figure 8:
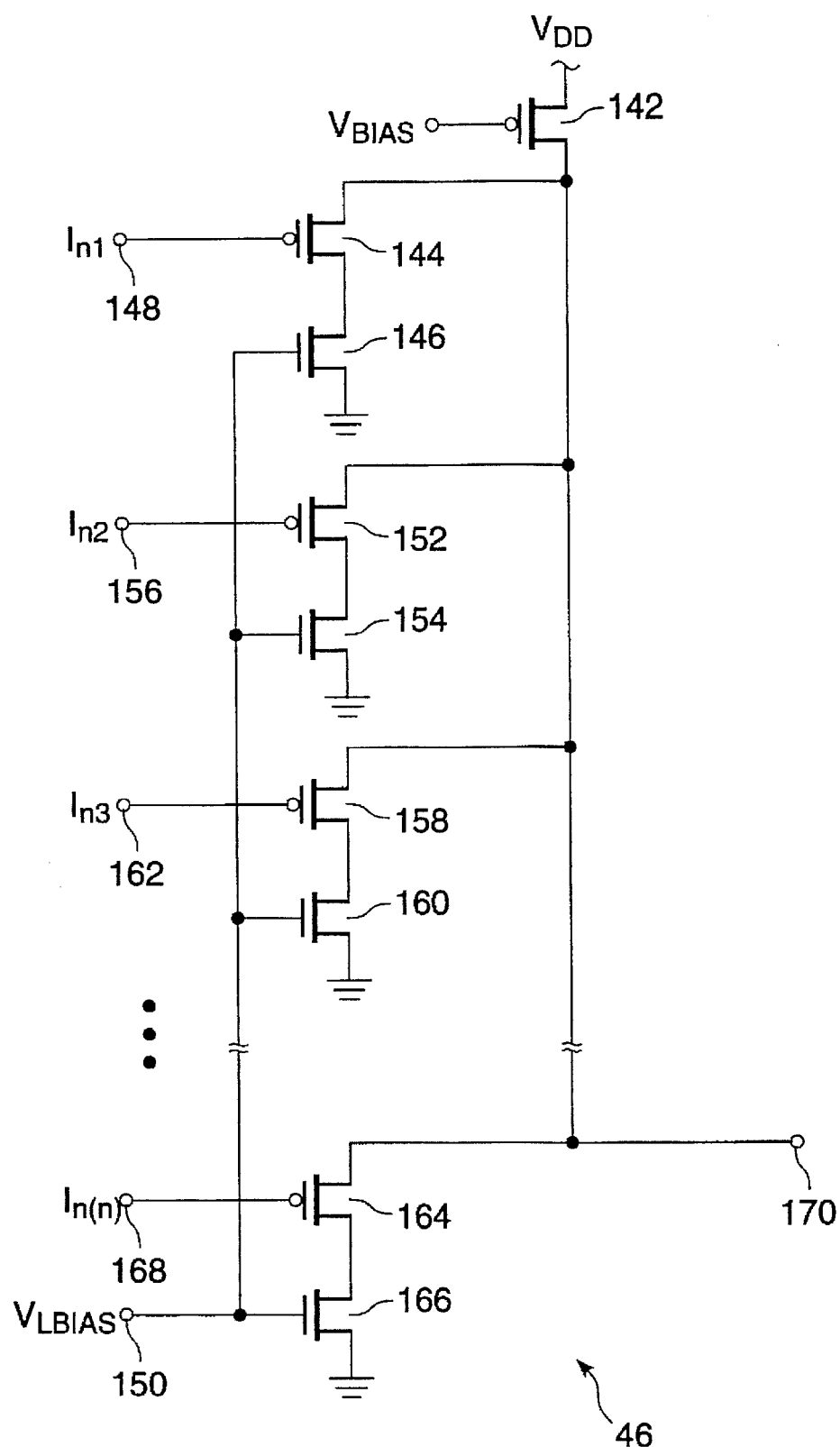
FIG. 8 is a schematic diagram of a minimum detector circuit according to a presently preferred embodiment of the invention.

Referring now to FIG. 8, a schematic diagram is presented of a minimum detector circuit 46 of FIG. 2. While the X dimension minimum detector circuit 46 is illustratively disclosed herein, those of ordinary skill in the art will understand that the Y dimension minimum detector circuit functions in the same manner.

According to a presently preferred embodiment of the invention, minimum detector circuit 46 includes a P-channel MOS bias transistor 142 having its source connected to a voltage source $V_{DD}$ and its gate connected to a bias voltage $V_{BIAS}$. The inputs of the minimum detector circuit 46 are connected to the output nodes 84 of the respective integrating charge amplifiers. In the minimum detector circuit 46 illustrated in FIG. 8, there are (n) inputs. Each input section comprises a series pair of MOS transistors connected between the drain of P-channel MOS bias transistor 142 and ground.

Thus, the input section for $In_1$ comprises P-channel MOS input transistor 144 having its source connected to the drain of P-channel MOS bias transistor 142 and N-channel MOS current-limiting transistor 146 having its drain connected to the drain of P-channel MOS input transistor 144 and its source connected to ground. The gate of P-channel MOS input transistor 144 is connected to $In_1$ input node 148 and the gate of N-channel MOS current-limiting transistor 146 is connected to a source of limiting bias voltage $V_{LBIAS}$ at node 150.

Similarly, the input section for $In_2$ comprises P-channel MOS input transistor 152 having its source connected to the drain of P-channel MOS bias transistor 142 and N-channel MOS current-limiting transistor 154 having its drain connected to the drain of N-channel MOS input transistor 152 and its source connected to ground. The gate of P-channel MOS input transistor 152 is connected to $In_2$ input node 156 and the gate of N-channel MOS current-limiting transistor 154 is connected to node 150.

The input section for $In_3$ comprises P-channel MOS input transistor 158 having its source connected to the drain of P-channel MOS bias transistor 142 and N-channel MOS current-limiting transistor 160 having its drain connected to the drain of P-channel MOS input transistor 158 and its source connected to ground. The gate of P-channel MOS input transistor 158 is connected to $In_3$ input node 162 and the gate of N-channel MOS current-limiting transistor 160 is connected to node 150.

The input section for $In_{(n)}$ comprises P-channel MOS input transistor 164 having its source connected to the drain of P-channel MOS bias transistor 142 and N-channel MOS current-limiting transistor 166 having its drain connected to the drain of P-channel MOS input transistor 164 and its source connected to ground. The gate of P-channel MOS input transistor 164 is connected to $In_{(n)}$ input node 168 and the gate of N-channel MOS current-limiting transistor 146 is connected to node 150. The output of minimum detector circuit 46 is node 170.

Without averaging control, $V_{BIAS}$ and $V_{LBIAS}$ would be set so that the saturation currents in any one of transistors 146, 154, 160 N-channel MOS current-limiting ... 166 is much larger than the saturation current in P-channel MOS bias transistor 142. In this mode, assume that In1 is the smallest voltage of all n inputs. In this case P-channel MOS input transistor 144 is turned on strongly with N-channel MOS current-limiting transistor 146 taking all the current from P-channel MOS bias transistor 142. As a result, output node 170 moves down until P-channel MOS input transistor 144 is on just enough to sink all the current from P-channel MOS bias transistor 142. In this case all other P-channel MOS input/N-channel MOS current-limiting transistor pairs (152/154, 158/160 ... 164/166) turn off because their P-channel devices have an input voltage drive of less than that of transistor 144. The result is that the output is directly related to the minimum input voltage and is offset therefrom by a gate bias voltage.

Operating the minimum detector circuit 46 of FIG. 8 in an averaging mode provides substantial noise rejection in the system. If for some reason one input was noisy and gave a much smaller value than all other values it could cause the generation of an erroneous output voltage. According to the present invention, the goal is to detect the "background level" of an input with no input stimulus. This would be the true minimum value. Since there are typically more than one input in this state, several inputs can be averaged to form the minimum signal. This is done via the averaging mode, which is enabled by setting the $V_{LBIAS}$ current of each N-channel MOS current-limiting transistor 146, 154, 160 ... 166 to be some fraction of the current from P-channel MOS bias transistor 142.

For this invention the current set by $V_{LBIAS}$ is approximately one-third of the current from P-channel MOS bias transistor 142. Therefore, in order to sink all of the current from P-channel MOS bias transistor 142, at least three input P-channel MOS input/N-channel MOS current-limiting transistor pairs (144/146 ... 164/166) must be turned on. For that to happen the output node 170 must then be sitting at a voltage equal to a P-channel bias voltage above the third lowest input. It has thus, in effect, filtered out and ignored the two lower values.

The present embodiment of the minimum detect circuit of FIG. 8 has been described in terms of separately deriving an X minimum signal and a Y minimum signal and separately computing their weighted minima. Those of ordinary skill in the art will recognize that, pursuant to an equivalent embodiment, the weighted minima of the combined X and Y signals could be computed utilizing the principles disclosed herein.

Referring again to FIG. 2, the output of operational amplifier 48 (a transconductance amplifier operating as a comparator) and the bottom of capacitor 88 in the integrating charge amplifiers 70, 100, and 130 of FIGS. 4, 6a, and 7a has been held high by P-channel MOS transistor 50 during the scan operation or non-PROCESS cycles when the global PROCESS signal (FIG. 5) is low. When the PROCESS cycle starts, the PROCESS line goes high and P-channel MOS transistor 50 is turned off, thus enabling the action of minimum detector circuit 46. If the output of minimum detector circuit 46 is greater than the $V_{Thmin}$ at the input of operational amplifier 48, the output of operational amplifier 48 is driven low. This is a feedback loop because when the bottom of capacitor 88 in the integrating charge amplifiers (32-1 through 32-6) drives low it pulls the outputs of all integrating charge amplifiers (32-1 through 32-6) low also. This in turn pulls the output of minimum detector circuit 46 low. This feedback-settling process continues until the minimum detector circuit 46 output equals the $V_{Thmin}$ (FIG. 3b).

The $V_{Thmin}$ voltage is chosen so that when the integrating charge amplifiers (32-1 through 32-6) outputs are shifted down, the minimum charge amplifier output will generate no current in the voltage-to-current converter circuits 36.

Figure 9:
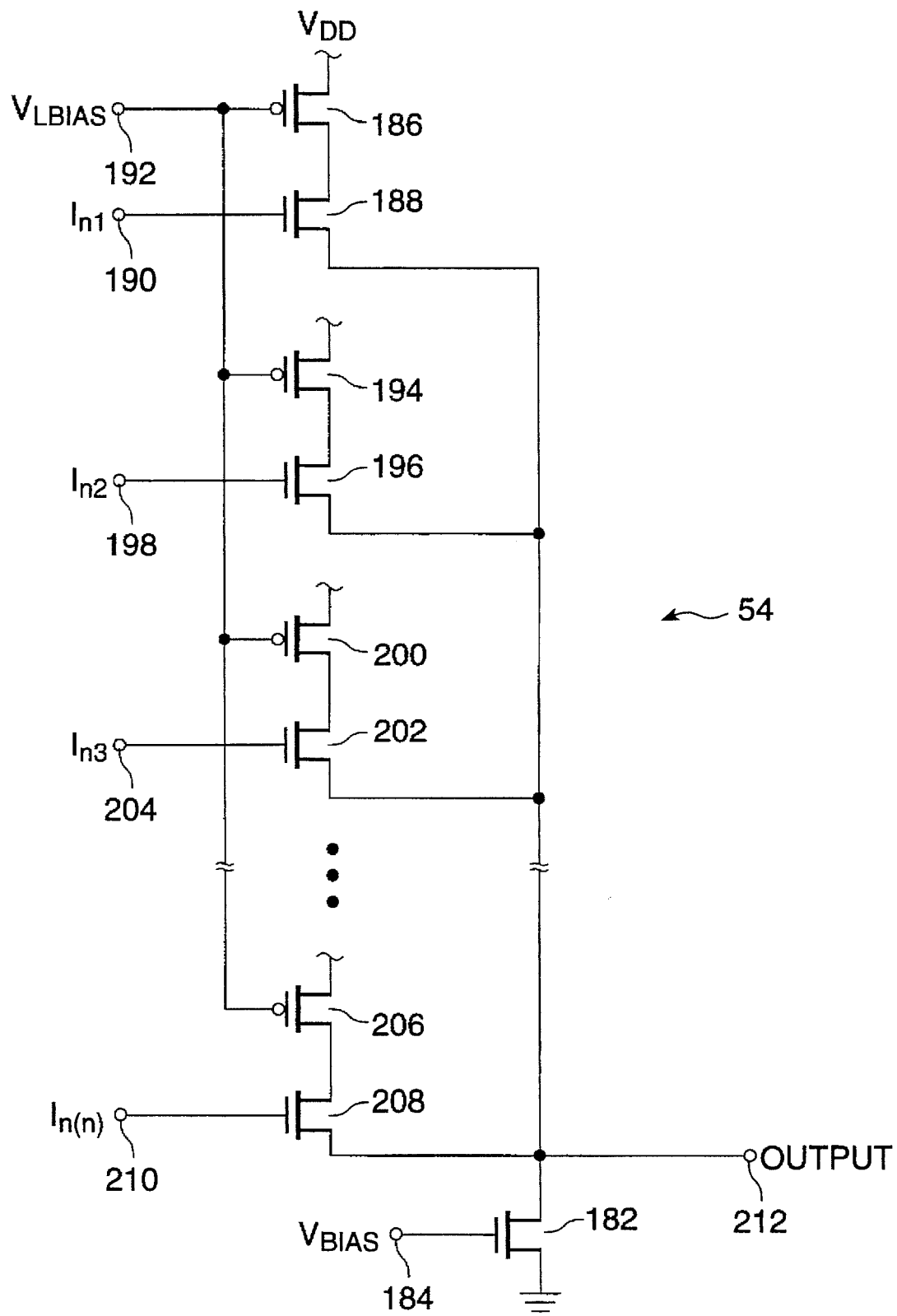
FIG. 9 is a schematic diagram of a maximum detector circuit according to a presently preferred embodiment of the invention.

Referring now to FIG. 9, the maximum detector circuit 54 will be disclosed. According to a presently preferred embodiment of the invention, maximum detector circuit 54 includes an N-channel bias transistor 182 having its source connected to ground and its gate connected to a bias voltage $V_{BIAS}$ at node 184. The inputs of the maximum detector circuit 54 are connected to the output nodes 84 of the respective integrating charge amplifiers 70, 100 and 130. In the maximum detector circuit 54 illustrated in FIG. 9, there are (n) inputs. Each input section comprises a series pair of MOS transistors connected between the drain of N-channel bias transistor 182 and a voltage source $V_{DD}$.

Thus, the input section for $In_1$ comprises P-channel MOS current-limiting transistor 186 having its source connected to $V_{DD}$ and its drain connected to the drain of N-channel MOS input transistor 188. The gate of N-channel MOS input transistor 188 is connected to $In_1$ input node 190 and the gate of P-channel MOS current-limiting transistor 186 is connected to a source of bias voltage $V_{LBIAS}$ at node 192. Similarly, the input section for $In_2$ comprises P-channel MOS current-limiting transistor 194 having its source connected to $V_{DD}$ and its drain connected to the drain of N-channel MOS input transistor 196. The gate of N-channel MOS input transistor 196 is connected to $In_2$ input node 198 and the gate of P-channel MOS current-limiting transistor 194 is connected to node 192. The input section for $In_3$ comprises P-channel MOS current-limiting transistor 200 having its source connected to VDD and its drain connected to the drain of N-channel MOS input transistor 202. The gate of N-channel MOS input transistor 202 is connected to $In_3$ input node 204 and the gate of P-channel MOS current-limiting transistor 200 is connected to node 192. The input section for In(n) comprises P-channel MOS current-limiting transistor 206 having its source connected to VDD and its drain connected to the drain of N-channel MOS input transistor 208. The gate of N-channel MOS input transistor 208 is connected to $In_{(n)}$ input node 210 and the gate of N-channel MOS current-limiting transistor 206 is connected to node 192. The sources of N-channel MOS input transistors 188, 198, 202, and 208 are connected together to the drain of N-channel MOS bias transistor 182. The output of maximum detector circuit 54 is node 212 at the common connection of the drain of N-channel bias transistor 182 and the sources of the N-channel input transistors 188, 196, 202 and 208.

The maximum detector circuit 54 acts analogously to the minimum detector circuit 46. The difference is that an N-channel bias transistor is used instead of a P-channel bias transistor and an N-channel transconductance amplifier is used in place of a P-channel transconductance amplifier. The result is the output will now track approximately an N-channel bias drop below the largest input (in non-averaging mode), since that much difference is needed to guarantee at least one input P-channel MOS current-limiting/N-channel MOS input transistor pair (186/188, 194/196 . . . 206/208) is on.

However for this circuit the output is not used for feedback, but is instead used to drive a amplifier comparator 56 (FIG. 2) which is set to trip if the input is greater than the voltage $V_{Thmax}$. If tripped, a MAX INTERRUPT signal is generated. The MAX INTERRUPT is used to "wake-up" a microprocessor and tell it that there is an object detected at the sensor. The signal is prevented from appearing on the MAX INTERRUPT line by gate AND gate 60 and the SAMPLE signal. The SAMPLE signal only allows the interrupt signal to pass after the circuit has settled completely. As shown in FIG. 2 by OR gate 58, either the X or the Y dimension maximum detector circuit 54 may be used to enable the MAX INTERRUPT signal.

Figure 10:
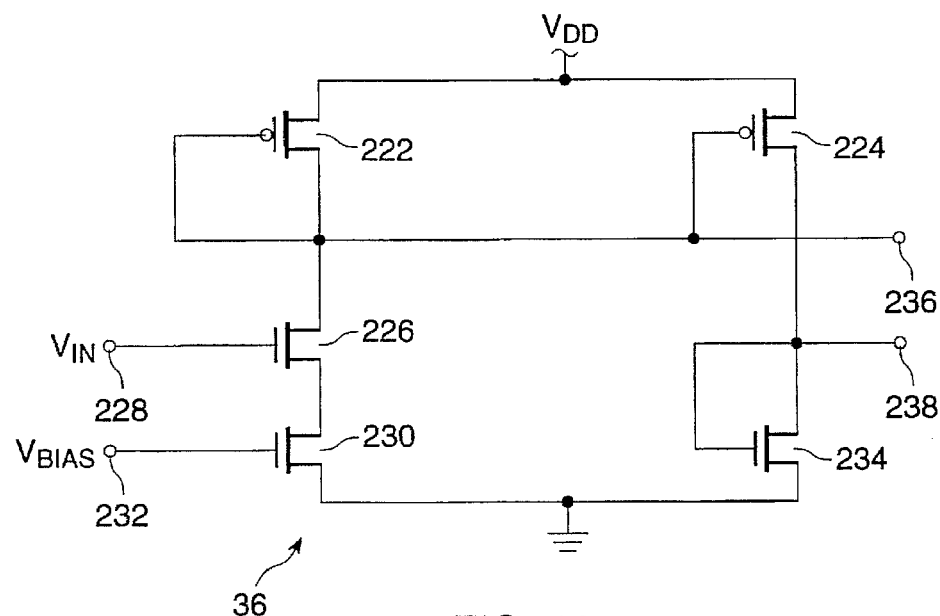
FIG. 10 is a schematic diagram of a linear voltage-to-current converter circuit according to a presently preferred embodiment of the invention.

Referring now to FIG. 10, a presently preferred embodiment of linear voltage-to-current circuit converter 36 is shown in schematic form. In the presently preferred embodiment of the invention, block 36 in FIG. 2 actually contains one voltage to current converter circuit of FIG. 10 for each output of an integrating charge amplifier.

In the circuit of FIG. 10, a current mirror comprises diode-connected P-channel MOS transistor 222 having its source connected to voltage source $V_{DD}$, and P-channel MOS transistor 224 having its source connected to voltage source $V_{DD}$ and its gate connected to the gate and drain of P-channel MOS transistor 222. An N-channel MOS input transistor 226 has its drain connected to the drain of P-channel MOS transistor 222, its gate connected to a voltage input node 228, and its source connected to the drain of N-channel MOS bias transistor 230. The source of N-channel MOS bias transistor 230 is connected to ground and its gate is connected to bias input 232. The drain of P-channel MOS transistor 224 is connected to the gate and drain of diode connected N-channel MOS transistor 234. The source of diode connected N-channel MOS transistor 234 is connected to ground. The common gate and drain connection of diodeconnected N-channel MOS transistor 234 is an N Bias current output node 238 and the common connection of the gate of P-channel MOS transistor 224 and the drain of P-channel MOS transistor 222 is a P Bias current output node 236 of the voltage-to-current-converter 36.

To generate a linear transformation N-channel MOS bias transistor 230 is biased in its linear region by setting $V_{BIAS}$ to be a value which is much greater than the largest value expected on the voltage input node 228. This will guarantee it is always operating in its linear region. For this invention the voltage to be expected at the voltage input node 228 of the voltage-to-current converter 36 is typically less than half of the power supply, so it will operate linearly if $V_{BIAS}$ is set to the power supply or greater.

The transconductance of N-channel MOS input transistor 226 is designed to be as large as reasonable. The result is that N-channel MOS input transistor 226 will operate like a follower with a resistor in its source, and hence will give a linear change of output current versus a linear change in input voltage.

The current is sourced by diode-connected P-channel MOS transistor 222 which acts as half of a CMOS P-channel current mirror and provides a reference for P Bias Output node 236 for the position encode circuit 38 shown in FIG. 2. The current is mirrored thru P-channel MOS transistor 224 and diode connected N-channel MOS transistor 234 generating a reference at N Bias output node 238 for the position encode circuit 38.

For the purposes of this embodiment, a linear transfer function between voltage and current has been selected. Those of ordinary skill in the art will recognize that, under certain circumstances, a non-linear transfer function will be desired.

The linear voltage-to-current converter 36 of FIG. 10 is disclosed in U.S. Pat. No. 5,096,284 operating in the weak inversion region. This circuit is used in the strong inversion region in the present invention, however, for certain applications, the weak inversion mode may be preferred.

Figure 11:
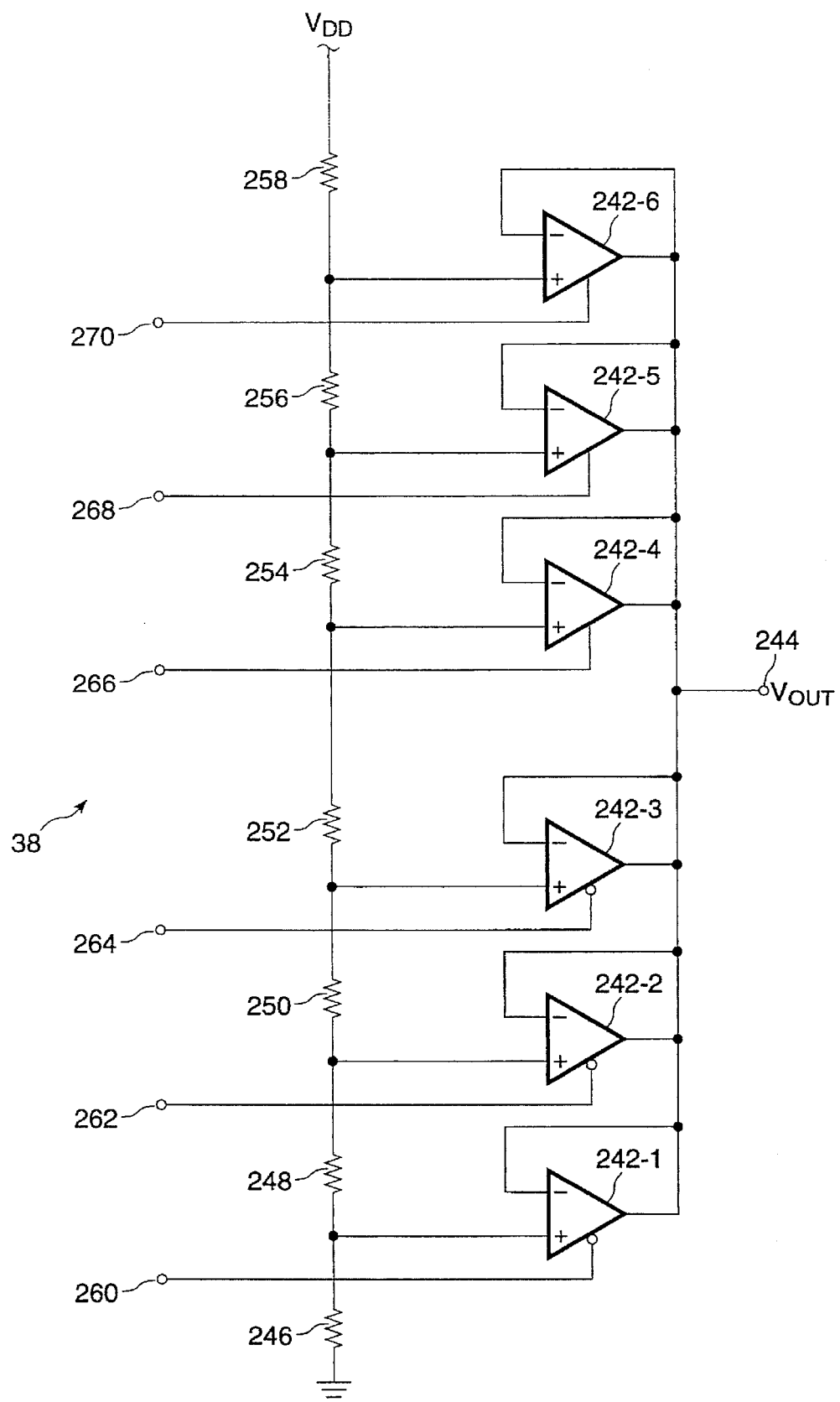
FIG. 11 is a schematic diagram of a position encoder centroid computing circuit according to a presently preferred embodiment of the invention.

Referring now to FIG. 11, a presently preferred embodiment of a position encode circuit 38 of FIG. 2 is shown in schematic diagram form. The circuits in the X and Y dimensions are identical. The position encode circuit 38 is shown having six inputs, but those of ordinary skill in the art will recognize that, due to its symmetry, it may be arbitrarily expanded.

As presently preferred, position encode circuit 38 includes a plurality of transconductance amplifiers 242-1 through 242-6 connected as followers. The outputs of all transconductance amplifiers 242-1 through 242-6 are connected together to a common node 244, which comprises the position encode output node of the circuit 38.

The non-inverting inputs of transconductance amplifiers 242-1 through 242-6 are connected to a resistive voltage divider network comprising resistors 246, 248, 250, 252, 254, 256, and 258, shown connected between $V_{DD}$ and ground.

Transconductance amplifiers 242-1 through 242-3 have P-channel MOS bias transistors and transconductance differential pair inputs due to the input operating range between zero volts and $V_{DD}/2$, and amplifiers 242-4 through 242-6 have N-channel MOS bias transistors and differential pair inputs due to the input operating range between $V_{DD}/2$ and $V_{DD}$. Those of ordinary skill in the art will readily recognize that transconductance amplifiers 242-4 through 242-6 will be configured exactly like transconductance amplifiers 242-1 through 242-3, except that all transistor and supply voltage polarities are reversed. The input nodes $I_{In1}$ through $I_{In6}$ (reference numerals 260, 262, 264, 266, 268, and 270) of the circuit are connected to the gates of the MOS bias transistors of the transconductance amplifiers 242-1 through 242-6, respectively. The inputs $I_{In1}$ through $I_{In3}$ are driven by the P Bias output nodes 236 of their respective linear voltage-to-current converters and the inputs $I_{In4}$ through $I_{In6}$ are driven by the N Bias output nodes 238 of their respective linear voltage-to-current converters.

The position encode circuit 38 of FIG. 11 will provide a weighted mean (centroid) of the input currents weighted by the voltages on the resistor divider circuit to which the inputs of the amplifiers 242-1 through 242-6 are connected. If the transconductance resistors 246, 248, 250, 252, 254, 256, and 258 are all equal then the result is a circuit which is a linear position encoder, with its output voltage varying between the power supply rails. Because it is a weighted mean, it averages all current inputs which in turn generates an interpolated output. This arrangement affords finer resolution than the voltage spacing of voltage nodes "n" at the input. This is key to making a dense circuit function. This circuit is an improvement of a circuit described in DeWeerth, Stephen P., Analog VLSI Circuits For Sensorimotor Feedback, Ph.D Thesis, California Institute of Technology, 1991.

Figure 12:
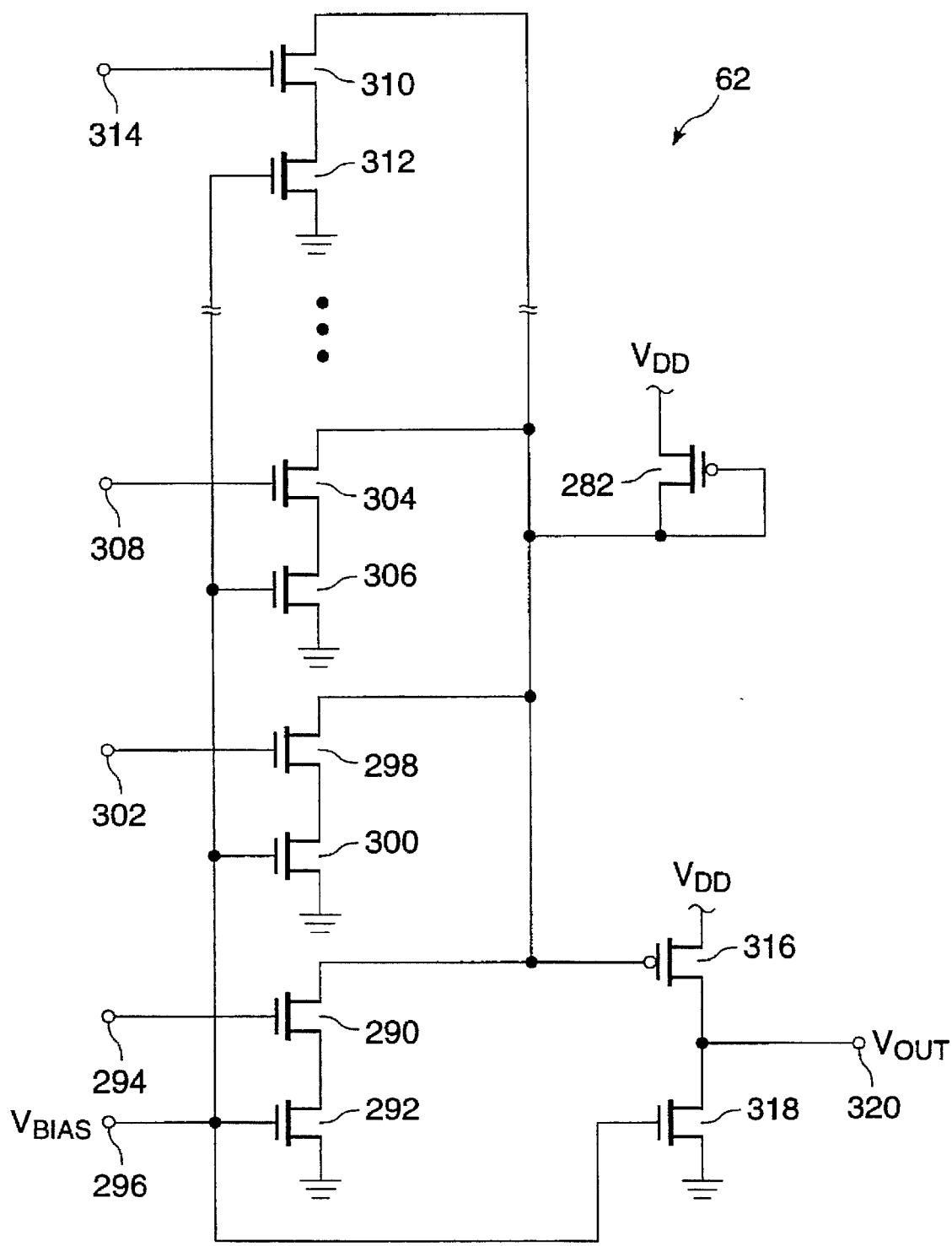
FIG. 12 is a schematic diagram of a Z Sum circuit according to a presently preferred embodiment of the invention.

Referring now to FIG. 12, a presently preferred embodiment of a Z Sum circuit 62 of FIG. 2 is shown. For purposes of illustration, Z Sum circuit 62 is shown to include four inputs. Those of ordinary skill in the art will readily understand how to provide additional inputs.

The four input sections for the Z Sum circuit 62 illustrated in FIG. 12 each comprise two N-channel MOS transistors connected in series. Thus a first input section comprises N-channel MOS input transistor 290, having its drain connected to the drain of P-channel MOS bias transistor 282 and its source connected to the drain of N-channel MOS transistor 292. The gate of N-channel MOS input transistor 290 is connected to input node $In_1$ at reference numeral 294. The gate of N-channel MOS bias transistor 292 is connected to bias input node 296.

A second input section comprises N-channel MOS input transistor 298, having its drain connected to the drain of P-channel MOS bias transistor 282 and its source connected to the drain of N-channel MOS transistor 300. The gate of N-channel MOS input transistor 298 is connected to input node $In_2$ at reference numeral 302. The gate of N-channel MOS bias transistor 300 is connected to bias input node 296.

A third input section comprises N-channel MOS input transistor 304, having its drain connected to the drain of P-channel MOS bias transistor 282 and its source connected to the drain of N-channel MOS transistor 306. The gate of N-channel MOS input transistor 304 is connected to input node $In_3$ at reference numeral 308. The gate of N-channel MOS bias transistor 306 is connected to bias input node 296.

A fourth input section comprises N-channel MOS input transistor 310, having its drain connected to the drain of P-channel MOS bias transistor 282 and its source connected top the drain of N-channel MOS transistor 312. The gate of N-channel MOS input transistor 310 is connected to input node In4 at reference numeral 314. The gate of N-channel MOS bias transistor 312 is connected to bias input node 296. The common drain connections of N-channel MOS input transistors 290, 298, 304, and 310 are connected to the gate of P-channel MOS transistor 316.

The Z sum circuit 62 of FIG. 12 is analogous to the linear voltage-to-current converter circuit 36 of FIG. 10. However in this case there are multiple circuit sections which have their currents all summed together (N-channel MOS transistors 290/292, 298/300, 304/306 . . . 310/312) into the P-channel MOS transistor 282.

P-channel MOS transistors 282 and 316 form a current mirror. Their sources are connected to voltage source VDD and their gates are connected together to the drain P-channel MOS of transistor 282. The drain of P-channel MOS transistor 316 is connected to the drain of N-channel MOS transistor 318, which has its source connected to ground. The common connection of the drains of MOS transistors 316 and 318 forms a voltage output node 320 for the circuit Z sum 62.

P-channel MOS transistor 316 drives N-channel MOS transistor 318 which is operating in its linear region. The result is a voltage which is proportional to the current from N-channel MOS transistor 316. Therefore the voltage at voltage output node 320 is a scaled sum of all the input voltages, and is utilized by the multiplier circuit 64 shown in FIG. 2.

Figure 13:
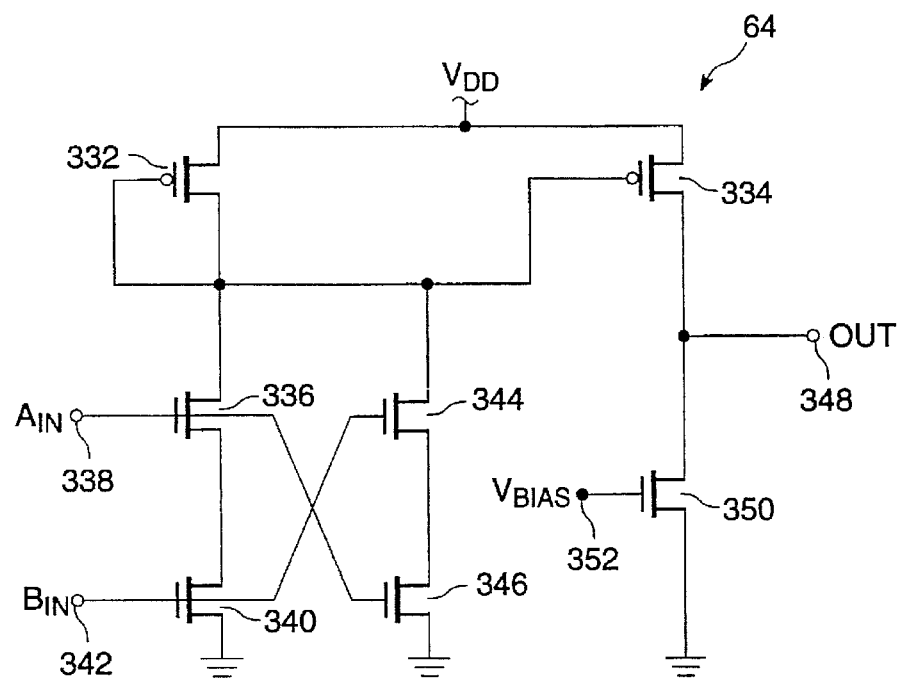
FIG. 13 is a schematic diagram of a multiplier circuit according to a presently preferred embodiment of the invention.

Referring now to FIG. 13, a presently preferred embodiment of the multiplier circuit 64 of FIG. 2 is presented in schematic form. P-channel MOS transistors 332 and 334 form a current mirror. N-channel MOS transistor 336 has its drain connected to the drain of P-channel MOS transistor 332, its gate connected to first voltage input node 338, and its source connected to the drain of N-channel MOS transistor 340. The gate of N-channel MOS transistor 340 is connected to second voltage input node 342 and its source is connected to ground. N-channel MOS transistor 344 has its drain connected to the gate and drain of P-channel MOS transistor 332. The gate of N-channel MOS transistor 344 is connected to second voltage input node 342 and its source is connected to the drain of N-channel MOS transistor 346. The gate of N-channel MOS transistor 346 is connected to first voltage input node 338 and its source is connected to ground. The sources of P-channel MOS transistors 332 and 334 are connected to voltage source $V_{DD}$. The drain of P-channel MOS transistor 334 is connected to output node 348 and to the drain of N-channel MOS transistor 350. The gate of N-channel MOS transistor 350 is connected to input bias node 352.

The multiplier circuit 64 of FIG. 13 is a symmetrized extension of the multiplier described in U.S. Pat. No. 5,095,284 and is a wide input range, voltage-input, voltage-output multiplier circuit. Because of the symmetrical input stage, the multiplier circuit 64 can be operated both above and below the threshold voltages of transistors 340 and 346.

The currents from the two N-channel MOS transistor pairs 336/340 and 344/346 are summed into the current mirror of P-channel transistors 332 and 334 and appear at the drain of P-channel MOS transistor 334. N-channel MOS transistor 350 is biased to be in its linear region by bias input 352. Therefore, the output voltage at output node 348 will be proportional to the conductance of N-channel MOS transistor 350 multiplied by the current driven by P-channel MOS transistor 334. The bias voltage at input bias node 352 is adjusted to scale the range of Vout values at output node 348 and, once set, is left constant. Thereafter, the output voltage is proportional to the current injected from P-channel MOS transistor 334, and hence is proportional to the product of the two input voltages at first and second voltage input nodes 338 and 342.

According to another aspect of the present invention, a position matrix sensing system is disclosed herein. The position matrix embodiment of the present invention is a straightforward extension of the finger position invention and uses much the same circuitry and basic signal flow. The main differences are in the measurement technique and the amount of information stored. The goal is to provide a matrix of voltages, V(x,y), that represent the proximity of the object to every node (x,y) on the sensor matrix. Instead of using this set of voltages to drive position encoders in the X and Y dimensions separately, as in the finger position embodiment, the information is instead sent to the input of a neural network circuit, which uses this multi-dimensional information to help it make decisions about what the input means.

In the finger position embodiment, the driving-point capacitance information is used for position detection. However, because the driving-point capacitance looks at the total capacitive effect on the node being measured, it is incapable of resolving what is happening at each X and Y location on the sensor.

The position matrix embodiment of the present invention has the capability of resolving the capacitive effect at each X and Y location of the sensor. In this embodiment the driving-point capacitance circuit is only used to inject charge into the X matrix node. The trans-capacitance (i.e., the capacitance between a selected X node and a selected Y node in the sensor matrix) causes some of that charge to in turn be injected into a Y node. This injected charge is measured by the charge-sensitive amplifier connected to the Y node, thus forming a receiving-point capacitance circuit.

Figure 14:
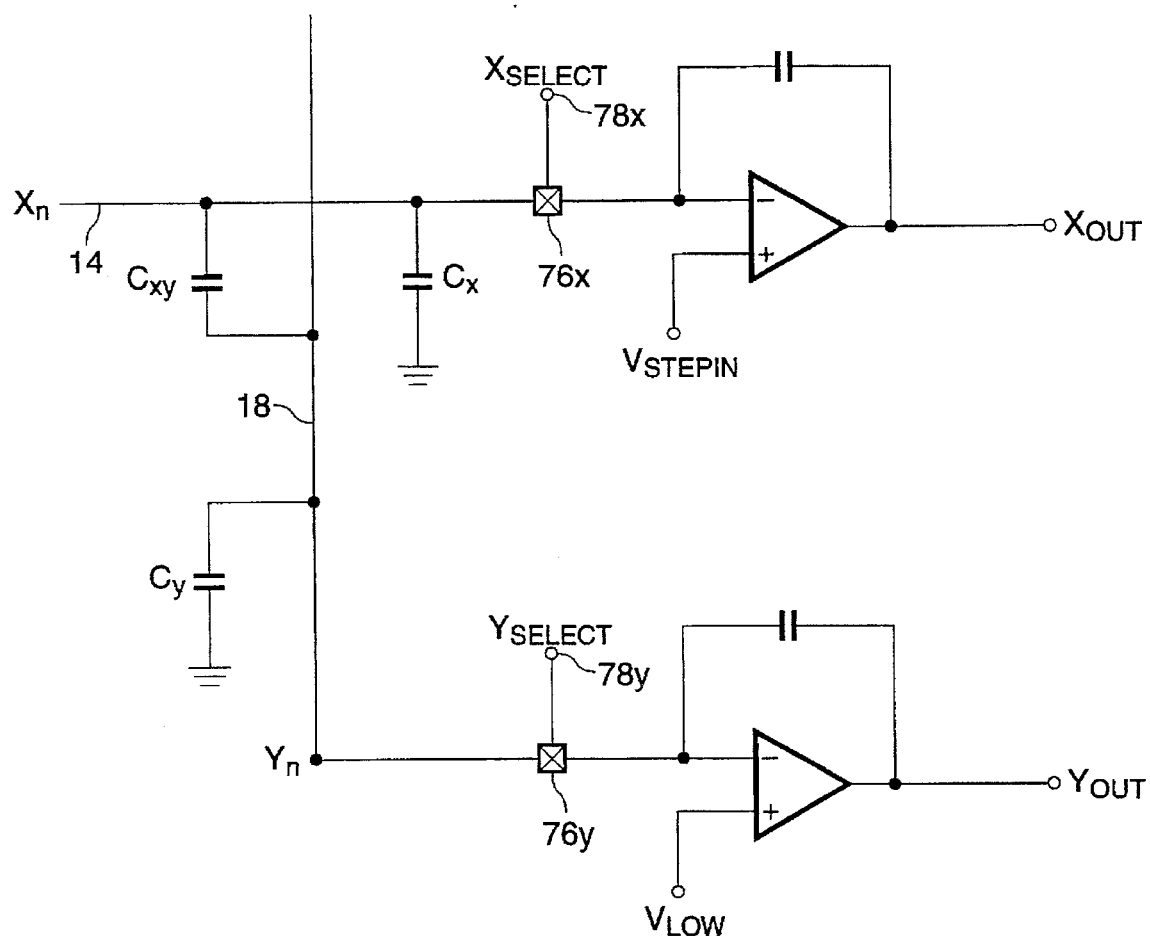
FIG. 14 is a schematic diagram of a combination driving-point impedance circuit and receiving-point impedance circuit according to a presently preferred position matrix embodiment of the invention.

Referring now to FIG. 14, a presently preferred combination driving-point capacitance circuit and receiving-point capacitance circuit is shown in schematic diagram form. A representative X node $X_{(n)}$ at reference numeral 14 and a selected Y node $Y_{(n)}$ at reference numeral 18, are shown each having a self capacitance $C_X$ and $C_Y$, respectively. Transcapacitance between nodes $X_{(n)}$ $Y_{(n)}$ is represented by capacitor $C_{XY}$.

A driving-point capacitance measurement is made of row line $X_{(n)}$ by a circuit which, as shown, may be one of the integrating charge amplifier circuits of either FIG. 6a or FIG. 7a, equipped with switches to zero out the matrix prior to injecting charge onto the matrix. The output of this circuit need not be used for anything. After the driving-point capacitance measurement has been made for a particular X line, charge is injected into all of the Y receiving-point capacitance measuring circuits (the integrating charge amplifier). If all Y outputs are monitored simultaneously then for one X node, a profile of all the transcapacitive effects at all the Y nodes that cross it will be created as a set of voltages V(x,1), V(x,2), . . . V(x,m) that are a profile of the object (or objects) proximity on that X node. This sequence is done for every X node in the matrix resulting in a complete matrix of voltages whose values are proportional to the proximity of nearby objects.

As shown in FIG. 14, the receiving-point circuit can be an integrating charge amplifier identical to that used in the driving-point circuit. However, there are three differences in the way that the Y receiving circuit is used. First, the $V_{STEP}$ node is left at a constant voltage, $V_{LOW}$, by disabling the STEP input such that switch 112 (FIGS. 6a and 7a) is always on and switch 110 is always off. Second, the Y receiving circuits are not individually selected, but instead are all selected simultaneously. Hence, there is only one Y select line for all Y inputs. Third, the RESET1 line is not used in the receiving-point circuit, and switch 106 (FIGS. 6a and 7a) is always off. These circuits will give an output voltage which is proportional to the amount of charge injected onto the Y node. Since the trans-capacitance varies with the proximity of an object, the voltage is proportional to the proximity of an object.

The position matrix embodiment requires storage of all of the output signals from the receiving-point impedance capacitance circuits in both the X and Y directions. This may be a accomplished by providing a sample/hold circuit matrix or a charge-coupled device (CCD) array as is known in the art. The structure of an illustrative sample/hold matrix is disclosed in FIG. 15, which shows a portion of a sample/hold array 350 suitable for use in the present invention. The sample/hold array 350 is arranged as a plurality of rows and columns of individual sample/hold circuits. The number of rows is equal to the number of Y positions in the sensor matrix and the number of columns is equal to the number of X positions in the sensor matrix. For example, a 15×15 sensor matrix requires 15 rows and 15 columns. All of the voltage data inputs in a row are wired together and the sample/hold control inputs of all the sample/hold circuits in a column are connected to one of the select signals (FIG. 5) such that the select inputs from the X direction drive the sample/hold circuits in the matrix storing the Y data. Those of ordinary skill in the art will note that the roles of X and Y may be reversed.

Figure 16A:
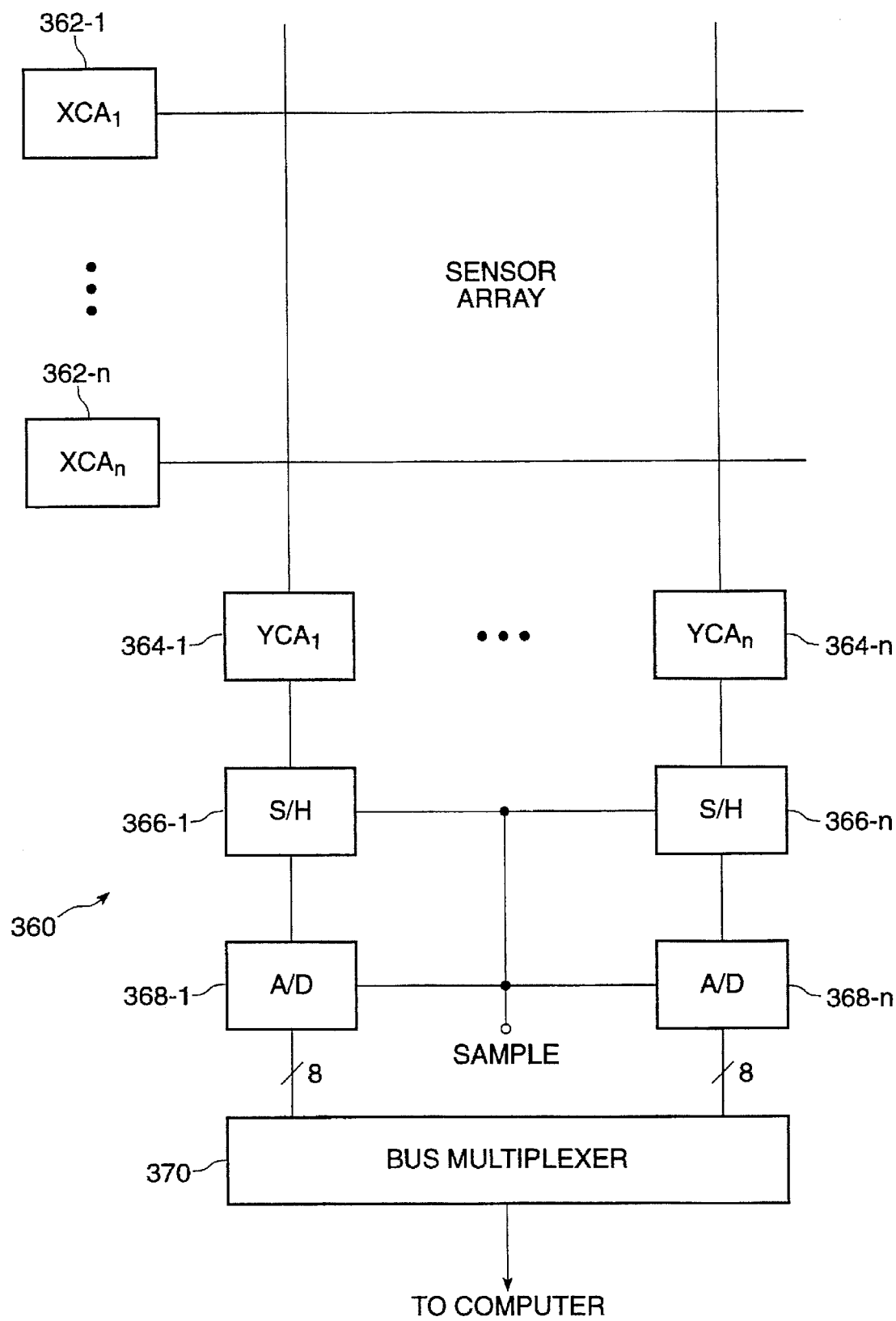
FIG. 16a is a block diagram of a simple version of a position matrix embodiment of the present invention in which the matrix of voltage information is sent to a computer which processes the data.
Figure 16B:
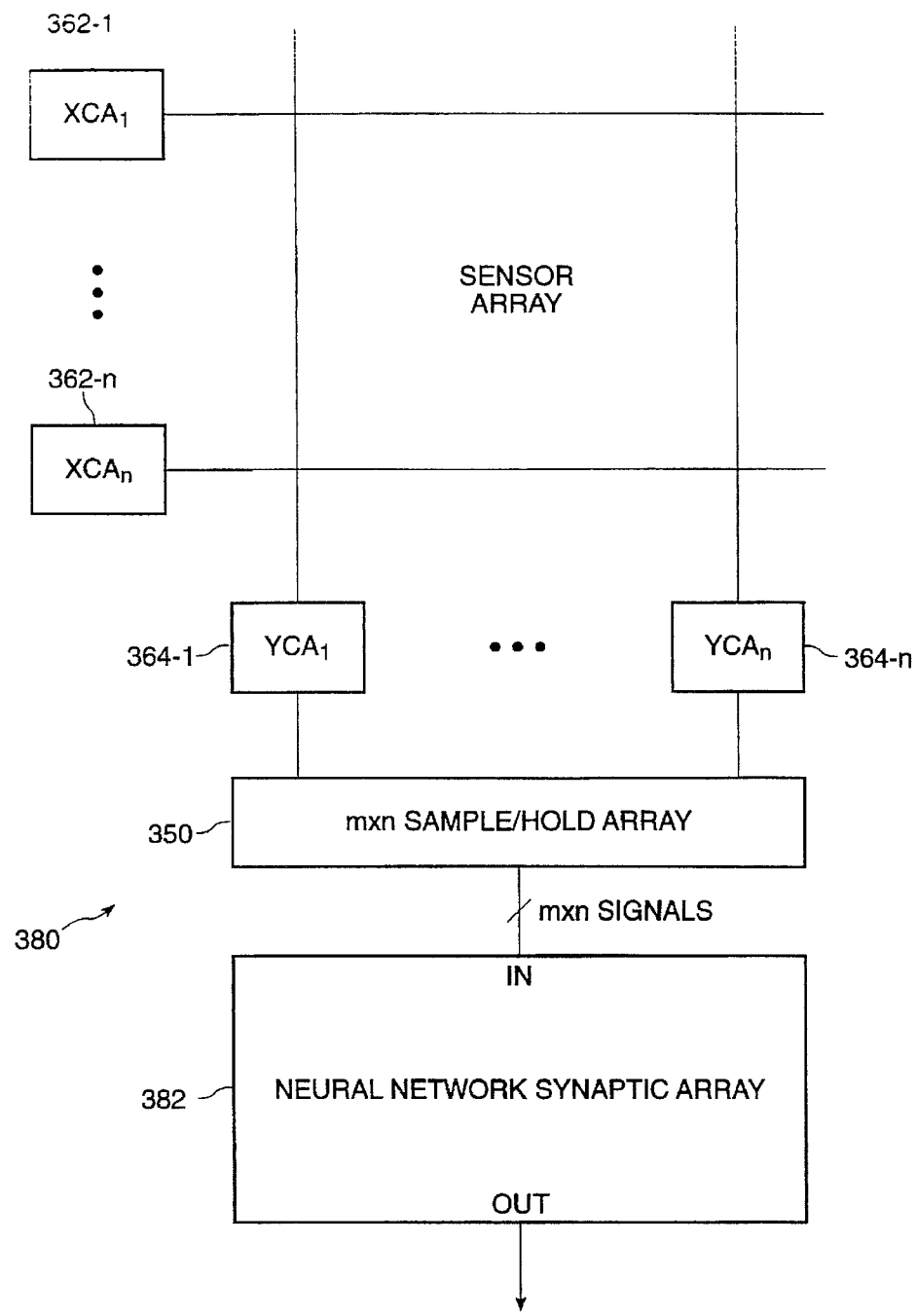
FIG. 16b is a block diagram of a second version of a position matrix embodiment of the present invention employing a sample/hold array such as that depicted in FIG. 15.

Referring now to FIGS. 16a and 16b, two possible embodiments of the position matrix system of the present invention are illustrated. In the simplest embodiment, the matrix of voltage information is sent to a computer which processes the data. This simple embodiment is shown in FIG. 16a. The approach of FIG. 16a is feasible if the input profile shapes change no faster than about every millisecond.

Figure 15:
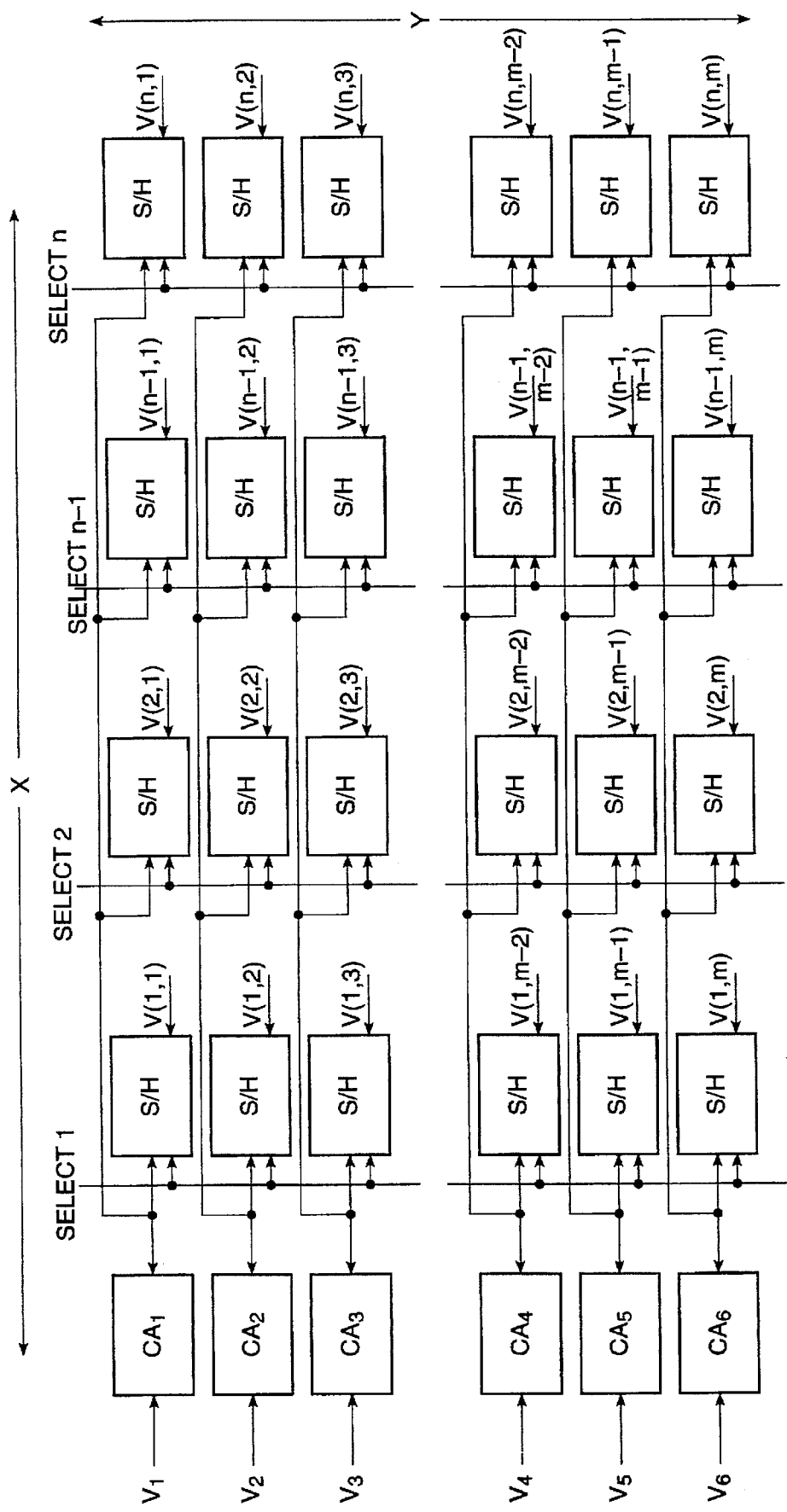
FIG. 15 is a block diagram of a structure of a portion of a sample/hold array suitable for use in the present invention.

In the embodiment of position matrix system (reference numeral 360) illustrated in FIG. 16a, the X dimension integrating charge amplifiers (reference numerals 362-1 through 362-n) are used to perform the driving-point capacitance measurements disclosed herein for all X lines in the matrix. For each X line driven, the Y dimension integrating charge amplifiers (reference numerals 364-1 through 364-n) are used to perform the receiving-point capacitance measurements disclosed herein. The sample/hold matrix of FIG. 15 is not required. Instead, one sample/hold amplifier (366-1 through 366-n) is required per Y output to sample the output voltages from the Y dimension integrating charge amplifiers 364-1 through 364-n at the end of each X select period.

These outputs are digitized by A/D converters 368-1 through 368-n respectively. In the illustrative embodiment of FIG. 16a, the digital resolution will be of the order of 8 bits. The 8-bit data words from each N/D converter 368-1 through 368-n are multiplexed down to a bus width that is more easily handled by a computer by multiplexer 370. Multiplexer 370 is a conventional multiplexer device known to those of ordinary skill in the art. The output of multiplexer 370 is presented to a computer which may then process the data in an appropriate manner.

A second illustrative embodiment of position matrix system (reference numeral 380) is shown in FIG. 16b. As in the embodiment of FIG. 16a, the X dimension integrating charge amplifiers (reference numerals 362-1 through 362-n) are used to perform the driving-point capacitance measurements disclosed herein for all X lines in the matrix. For each X line driven, the Y dimension integrating charge amplifiers (reference numerals 364-1 through 364-n) are used to perform the receiving-point capacitance measurements disclosed herein.

The sample/hold array 350 of FIG. 15 is employed and describes the extraction of derivation of the n by m array of voltages applications (V(1,1) to V(n,m)). These voltages are then sent to the input of a single or multiple level neural network 382. Each input neuron will have to have n*m input nodes to support the full size of the sensor array voltage matrix V(n,m).

An example of a single level neural network array circuitry 382, including the preprocessing and sample/hold circuitry 350 required, is disclosed in U.S. Pat. No. 5,083, 044. This circuit could be used as is or could be replicated and built into two or three layers giving more power and functionality. These variations and many others are well described in the literature, such as Hertz, Krogh, and Palmer, A Lecture Notes Volume in the Santa Fe Institute Studies in the Sciences of Complexity, Allen M. Wilde, Publ. (1991).

The typical application of this embodiment would require a neural network or computer program that at the primitive level can discern objects (finger touch points). This is the basic symbol, the presence of a finger, that is manipulated. From that point there may be predetermined gestures that the system looks for which indicate action. Motion may also need to be detected. A possible solution for this may be found in Mead, Analog VLSI and Neural Systems, Addison-Wesley (1989), Chapter 14, Optical Motion Sensor.

Because of the unique physical features of the present invention, there are several ergonomically interesting applications that were not previously possible. Presently a Mouse or Trackball is not physically convenient to use on portable computers. The present invention provides a very convenient and easy-to-use cursor position solution that replaces those devices.

In mouse-type applications, the sensor of the present invention may be placed in a convenient location, e.g., below the "space bar" key in a portable computer. When placed in this location, the thumb of the user may be used as the position pointer on the sensor to control the cursor position on the computer screen. The cursor may then be moved without the need for the user's fingers to leave the keyboard. Ergonomically, this is similar to the concept of the Macintosh Power Book with its trackball, however the present invention provides a significant advantage in size over the track ball. Extensions of this basic idea are possible in that two sensors could be placed below the "space bar" key for even more feature control.

The computer display with its cursor feedback is one small example of a very general area of application where a display could be a field of lights or LED's, a LCD display, or a CRT. Examples include touch controls on laboratory equipment where present equipment uses a knob/button/touch screen combination. Because of the articulating ability of this interface, one or more of those inputs could be combined into one of our inputs.

Consumer Electronic Equipment (stereos, graphic equalizers, mixers) applications often utilize significant front panel surface area for slide potentiometers because variable control is needed. The present invention can provide such control in one small touch pad location. As Electronic Home Systems become more common, denser and more powerful human interface is needed. The sensor technology of the present invention permits a very dense control panel. Hand Held TV/VCR/Stereo controls could be ergonomically formed and allow for more powerful features if this sensor technology is used.

The sensor of the present invention can be conformed to any surface and can be made to detect multiple touching points, making possible a more powerful joystick. The unique pressure detection ability of the sensor technology of the present invention is also key to this application. Computer games, "remote" controls (hobby electronics, planes), and machine tool controls are a few examples of applications which would benefit from the sensor technology of the present invention.

Musical keyboards (synthesizers, electric pianos) require velocity sensitive keys which can be provided by the pressure sensing ability of this sensor. There are also pitch bending controls, and other slide switches that could be replaced with this technology. An even more unique application comprises a musical instrument that creates notes as a function of the position and pressure of the hands and fingers in a very articulate 3-d interface.

The sensor technology of the present invention can best detect any conducting material pressing against it. By adding a conductive foam material on top of the sensor the sensor of the present invention may also indirectly detect pressure from any object being handled, regardless of its electrical conductivity.

Because of the amount of information available from this sensor it will serve very well as an input device to virtual reality machines. It is easy to envision a construction that allows position-monitoring in three dimensions and some degree of response (pressure) to actions.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An object proximity sensor, including:

a plurality of spaced-apart conductive sensor pads disposed in a matrix of rows and columns on a substrate;

a plurality of row conductive lines disposed on said substrate and generally aligned with said rows, each of said row conductive lines electrically contacting every second one of said sensor pads in one of said rows;

a plurality of column conductive lines disposed on said substrate, insulated from said row conductive lines and generally aligned with said columns, each of said column conductive lines electrically contacting the ones of said sensor pads in one of said columns which are not contacted by said row conductive lines;

means for placing a step voltage onto each of said row conductive lines one at a time, and for simultaneously sensing the charge injected onto each of said column conductive lines in response to said step voltage placed onto each of said row conductive lines and for producing a set of object-sensed electrical signals related thereto.

2. The object proximity sensor of claim 1 wherein said row conductive lines are disposed on said first face of said substrate and said column conductive lines are disposed on a second face of said substrate opposite said first face.

3. The object proximity sensor of claim 1, further including:

means for sensing a no-object-present capacitance of each of said row conductive lines and for producing a set of no-object-present electrical signals related thereto; and means for subtracting said set of no-object-present electrical signals from said set of object-sensed electrical signals.

4. The object proximity sensor of claim 3 wherein said means for producing a set of no-object-present electrical signals related to said no-object-present capacitance of each of said row conductive lines comprises means for computing weighted minima of said object-sensed electrical signals thereof.

5. An object proximity sensor, including:

a plurality of spaced-apart conductive sensor pads disposed in a plurality of rows on a substrate, the ones of said sensor pads in odd numbered ones of said rows disposed along a first set of column positions and the ones of said sensor pads in even numbered ones of said rows disposed at a second set of column positions offset from said first set of column positions such that said sensor pads form a repetitive diamond pattern;

a plurality of row conductive lines disposed on said substrate and generally aligned with said rows, each of said row conductive lines electrically contacting every one of said sensor pads in one of said odd-numbered rows;

a plurality of column conductive lines disposed on said substrate, insulated from said row conductive lines and generally aligned with said offset column positions, each of said column conductive lines electrically contacting through said substrate the ones of said sensor pads in one of said offset column positions;

means for placing a step voltage onto each of said row conductive lines one at a time, and for simultaneously sensing the charge injected onto each of said column conductive lines in response to said step voltage placed onto each of said row conductive lines and for producing a set of object-sensed electrical signals related thereto.

6. The object proximity sensor of claim 5 wherein said row conductive lines are disposed on said first face of said substrate and said column conductive lines are disposed on a second face of said substrate opposite said first face.

7. The object proximity sensor of claim 5, further including:

means for sensing a no-object-present capacitance of each of said row conductive lines and for producing a set of no-object-present electrical signals related thereto; and means for subtracting said set of no-object-present electrical signals from said set of object-sensed electrical signals.

8. The object proximity sensor of claim 7 wherein said means for producing a set of no-object-present electrical signals related to said no-object-present capacitance of each of said row conductive lines comprises means for computing weighted minimums of said object-sensed electrical signals thereof.

9. An object proximity sensor, including:

a plurality of spaced-apart conductive sensor pads disposed in a plurality of rows on a substrate, the ones of said sensor pads in odd numbered ones of said rows disposed along a first set of column positions and the ones of said sensor pads in even numbered ones of said rows disposed at a second set of column positions offset from said first set of column positions and said rows spaced apart such that said sensor pads form a closely packed repetitive pattern wherein each pad is not in contact with adjoining pads;

a plurality of row conductive lines disposed on said substrate and generally aligned with said rows, each of said row conductive lines electrically contacting every one of said sensor pads in one of said odd-numbered rows;

a plurality of column conductive lines disposed on said substrate, insulated from said row conductive lines and generally aligned with said offset column positions, each of said column conductive lines electrically contacting the ones of said sensor pads in one of said offset column positions;

means for placing a step voltage onto each of said row conductive lines one at a time, and for simultaneously sensing the charge injected onto each of said column conductive lines in response to said step voltage placed onto each of said row conductive lines and for producing a set of object-sensed electrical signals related thereto.

10. The object proximity sensor of claim 9 wherein said row conductive lines are disposed on said first face of said substrate and said column conductive lines are disposed on a second face of said substrate opposite said first face.

11. The object proximity sensor of claim 9, further including:

means for sensing a no-object-present capacitance of each of said row conductive lines and for producing a set of no-object-present electrical signals related thereto: and means for subtracting said set of no-object-present electrical signals from said set of object-sensed electrical signals.

12. The object proximity sensor of claim 11 wherein said means for producing a set of no-object-present electrical signals related to said no-object-present capacitance of each of said row conductive lines comprises means for computing weighted minimums of said object-sensed electrical signals thereof.

13. A method for providing an electrical signal representative of the position of an object in a two dimensional plane, including the steps of:

providing a sensing plane including a matrix of conductive lines arranged as a plurality of spaced apart row conductive lines and column conductive lines, said sensing plane characterized by an inherent capacitance between the various ones of said row conductive lines and said column conductive lines, said capacitance varying with the proximity of an object to said row conductive lines and said column conductive lines;

placing a step voltage onto each of said row conductive lines one at a time, and simultaneously sensing the charge injected onto each of said column conductive lines in response to said step voltage placed onto each of said row conductive lines;

producing a set of object-sensed electrical signals related to said charge injected onto each of said column conductive lines as a result of placing said step voltage on each of said row conductive lines.

14. An object proximity sensor, including:

a plurality of spaced-apart conductive sensor pads disposed in a matrix of rows and columns on a substrate;

a plurality of row conductive lines disposed on said substrate and generally aligned with said rows, each of said row conductive lines electrically contacting every second one of said sensor pads in one of said rows;

a plurality of column conductive lines disposed on said substrate, insulated from said row conductive lines and generally aligned with said columns, each of said column conductive lines electrically contacting the ones of said sensor pads in one of said columns which are not contacted by said row conductive lines;

means for placing a step voltage onto each of said row conductive lines one at a time:

a plurality of sense amplifiers, each of said sense amplifiers having an input connected to a different one of said column conductive lines and an output;

a plurality of sample/hold circuits, each of said sample/hold circuits having a data input connected to the output of a different one of said sense amplifiers, a control input, and an output; and means for simultaneously placing a sample signal on the control inputs of all of said sample/hold circuits in response to said step voltage placed onto each of said row conductive lines to produce a set of object-sensed electrical signals related thereto at the outputs of said sample/hold circuits.

15. The object proximity sensor of claim 14 wherein said row conductive lines are disposed on said first face of said substrate and said column conductive lines are disposed on a second face of said substrate opposite said first face.

16. The object proximity sensor of claim 14, further including:

means for sensing a no-object-present capacitance between each individual one of said row conductive lines and each of said column conductive lines, for producing a set of no-object-present electrical signals related thereto; and means for subtracting said set of no-object-present electrical signals from said set of object-sensed electrical signals.

17. The object proximity sensor of claim 16 wherein said means for producing a set of no-object-present electrical signals related to said no-object-present capacitance of each of said row conductive lines and said no-object-present capacitance of each of said column conductive lines comprises means for computing weighted minima of said object-sensed electrical signals thereof.

18. An object proximity sensor, including:

a plurality of spaced-apart conductive sensor pads disposed in a plurality of rows on a substrate, the ones of said sensor pads in odd numbered ones of said rows disposed along a first set of column positions and the ones of said sensor pads in even numbered ones of said rows disposed at a second set of column positions offset from said first set of column positions such that said sensor pads form a repetitive diamond pattern;

a plurality of row conductive lines disposed on said substrate and generally aligned with said rows, each of said row conductive lines electrically contacting every one of said sensor pads in one of said odd-numbered rows;

a plurality of column conductive lines disposed on said substrate, insulated from said row conductive lines and generally aligned with said offset column positions, each of said column conductive lines electrically contacting through said substrate the ones of said sensor pads in one of said offset column positions;

means for placing a step voltage onto each of said row conductive lines one at a time;

a plurality of sense amplifiers, each of said sense amplifiers having an input connected to a different one of said column conductive lines and an output;

a plurality of sample/hold circuits, each of said sample/hold circuits having a data input connected to the output of a different one of said sense amplifiers, a control input, and an output; and means for simultaneously placing a sample signal on the control inputs of all of said sample/hold circuits in response to said step voltage placed onto each of said row conductive lines to produce a set of object-sensed electrical signals related thereto at the outputs of said sample/hold circuits.

19. The object proximity sensor of claim 18 wherein said row conductive lines are disposed on said first face of said substrate and said column conductive lines are disposed on a second face of said substrate opposite said first face.

20. The object proximity sensor of claim 18, further including:

means for sensing a no-object-present capacitance between each, individual one of said row conductive lines and each of said column conductive lines, for producing a set of no-object-present electrical signals related thereto; and means for subtracting said set of no-object-present electrical signals from said set of object-sensed electrical signals.

21. The object proximity sensor of claim 20 wherein said means for producing a set of no-object-present electrical signals related to said no-object-present capacitance of each of said row conductive lines and said no-object-present capacitance of each of said column conductive lines comprises means for computing weighted minimums of said object-sensed electrical signals thereof.

22. An object proximity sensor, including:

a plurality of spaced-apart conductive sensor pads disposed in a plurality of rows on a substrate, the ones of said sensor pads in odd numbered ones of said rows disposed along a first set of column positions and the ones of said sensor pads in even numbered ones of said rows disposed at a second set of column positions offset from said first set of column positions and said rows spaced apart such that said sensor pads form a closely packed repetitive pattern wherein each pad is not in contact with adjoining pads;

a plurality of row conductive lines disposed on said substrate and generally aligned with said rows, each of said row conductive lines electrically contacting every one of said sensor pads in one of said odd-numbered rows;

a plurality of column conductive lines disposed on said substrate, insulated from said row conductive lines and generally aligned with said offset column positions, each of said column conductive lines electrically contacting the ones of said sensor pads in one of said offset column positions;

means for placing a step voltage onto each of said row conductive lines one at a time;

a plurality of sense amplifiers, each of said sense amplifiers having an input and an output, the inputs of said sense amplifiers each connected to a different one of said column conductive lines;

a plurality of sample/hold circuits, each of said sample/hold circuits having a data input connected to the output of a different one of said sense amplifiers, a control input, and an output; and means for simultaneously placing a sample signal on the control inputs of all of said sample/hold circuits in response to said step voltage placed onto each of said row conductive lines to produce a set of object-sensed electrical signals related thereto at the outputs of said sample/hold circuits.

23. The object proximity sensor of claim 22 wherein said row conductive lines are disposed on said first face of said substrate and said column conductive lines are disposed on a second face of said substrate opposite said first face.

24. The object proximity sensor of claim 22, further including:

means for sensing a no-object-present capacitance between each individual one of said row conductive lines and each of said column conductive lines, for producing a set of no-object-present electrical signals related thereto; and means for subtracting said set of no-object-present electrical signals from said set of object-sensed electrical signals.

25. The object proximity sensor of claim 24 wherein said means for producing a set of no-object-present electrical signals related to said no-object-present capacitance of each of said row conductive lines and said no-object-present capacitance of each of said column conductive lines comprises means for computing weighted minimums of said object-sensed electrical signals thereof.

26. An object proximity sensor, including:

a plurality of spaced-apart conductive sensor pads disposed in a matrix of rows and columns on a substrate;

a plurality of row conductive lines disposed on said substrate and generally aligned with said rows, each of said row conductive lines electrically contacting every second one of said sensor pads in one of said rows;

a plurality of column conductive lines disposed on said substrate, insulated from said row conductive lines and generally aligned with said columns, each of said column conductive lines electrically contacting the ones of said sensor pads in one of said columns which are not contacted by said row conductive lines;

means for selecting individual ones of said row conductive lines one at a time and for simultaneously sensing the mutual capacitance between the selected one of said row conductive lines and each of said plurality of column conductive lines and for producing a set of object-sensed electrical signals related thereto.

27. The object proximity sensor of claim 26 wherein said row conductive lines are disposed on said first face of said substrate and said column conductive lines are disposed on a second face of said substrate opposite said first face.

28. The object proximity sensor of claim 26, further including:

means for sensing a no-object-present capacitance between each individual one of said row conductive lines and each of said column conductive lines, for producing a set of no-object-present electrical signals related thereto; and means for subtracting said set of no-object-present electrical signals from said set of object-sensed electrical signals.

29. The object proximity sensor of claim 28 wherein said means for producing a set of no-object-present electrical signals related to said no-object-present capacitance of each of said row conductive lines and said no-object-present capacitance of each of said column conductive lines comprises means for computing weighted minima of said object-sensed electrical signals thereof.

30. An object proximity sensor, including:

a plurality of spaced-apart conductive sensor pads disposed in a plurality of rows on a substrate, the ones of said sensor pads in odd numbered ones of said rows disposed along a first set of column positions and the ones of said sensor pads in even numbered ones of said rows disposed at a second set of column positions offset from said first set of column positions such that said sensor pads form a repetitive diamond pattern;

a plurality of row conductive lines disposed on said substrate and generally aligned with said rows, each of said row conductive lines electrically contacting every one of said sensor pads in one of said odd-numbered rows;

a plurality of column conductive lines disposed on said substrate, insulated from said row conductive lines and generally aligned with said offset column positions, each of said column conductive lines electrically contacting through said substrate the ones of said sensor pads in one of said offset column positions;

means for selecting individual ones of said row conductive lines one at a time and for simultaneously sensing the mutual capacitance between the selected one of said row conductive lines and all of said plurality of column conductive lines and for producing a set of object-sensed electrical signals related thereto.

31. The object proximity sensor of claim 30 wherein said row conductive lines are disposed on said first face of said substrate and said column conductive lines are disposed on a second face of said substrate opposite said first face.

32. The object proximity sensor of claim 30, further including:

means for sensing a no-object-present capacitance between each individual one of said row conductive lines and each of said column conductive lines, for producing a set of no-object-present electrical signals related thereto; and means for subtracting said set of no-object-present electrical signals from said set of object-sensed electrical signals.

33. The object proximity sensor of claim 32 wherein said means for producing a set of no-object-present electrical signals related to said no-object-present capacitance of each of said row conductive lines and said no-object-present capacitance of each of said column conductive lines comprises means for computing weighted minima of said object-sensed electrical signals thereof.

34. An object proximity sensor, including:

a plurality of spaced-apart conductive sensor pads disposed in a plurality of rows on a substrate, the ones of said sensor pads in odd numbered ones of said rows disposed along a first set of column positions and the ones of said sensor pads in even numbered ones of said rows disposed at a second set of column positions offset from said first set of column positions and said rows spaced apart such that said sensor pads form a closely packed repetitive pattern wherein each pad is not in contact with adjoining pads;

a plurality of row conductive lines disposed on said substrate and generally aligned with said rows, each of said row conductive lines electrically contacting every one of said sensor pads in one of said odd-numbered rows;

a plurality of column conductive lines disposed on said substrate, insulated from said row conductive lines and generally aligned with said offset column positions, each of said column conductive lines electrically contacting the ones of said sensor pads in one of said offset column positions;

means for selecting individual ones of said row conductive lines one at a time and for simultaneously sensing the mutual capacitance between the selected one of said row conductive lines and each of said plurality of column conductive lines and for producing a set of object-sensed electrical signals related thereto.

35. The object proximity sensor of claim 34 wherein said row conductive lines are disposed on said first face of said substrate and said column conductive lines are disposed on a second face of said substrate opposite said first face.

36. The object proximity sensor of claim 34, further including:

means for sensing a no-object-present capacitance between each of said row conductive lines and each of said column conductive lines, for producing a set of no-object-present electrical signals related thereto; and means for subtracting said set of no-object-present electrical signals from said set of object-sensed electrical signals.

37. The object proximity sensor of claim 36 wherein said means for producing a set of no-object-present electrical signals related to said no-object-present capacitance of each of said row conductive lines and said no-object-present capacitance of each of said column conductive lines comprises means for computing weighted minima of said object-sensed electrical signals thereof.

38. The method of claim 13, further including the steps of:

sensing a no-object-present mutual capacitance between each individual one of said row conductive lines and each of said column conductive lines, and producing a set of no-object-present electrical signals related thereto; and subtracting said set of no-object-present electrical signals from said set of object-sensed electrical signals.

* * * * *

UNITED STATES PATENT AND TRADEMARK OFFICE
CERTIFICATE OF CORRECTION

PATENT NO : 5,648,642
DATED : July 15, 1997
INVENTOR(S) : Robert J Miller and Stephen J Bisset It is certified that error appears in the above-indentified patent and that said Letters Patent is hereby corrected as shown below Column 3, line 5   replace "FIG 1 a" with --FIG 1A--

Column 6, line 37   replace "Y and Y" with --X and Y--

Column 7, line 46   replace "ND" with --A/D--

Column 8, line 37   replace "In" with --in--

Column 8, line 66   delete reference designation 62

Column 9, line 6   replace "ND" with --A/D--

Column 11, line 31   replace "RESET1 (n)" with --RESET1(n)--

Column 11, line 32   replace "RESET1 (n)" with --RESET1(n)--

Column 12, line 28   replace "at node" with --at RESET node--

Column 13, line 36   replace "one of transistors" with --one of N-channel MOS current-limiting transistors--

Column 13, line 39   replace "In1" with --$In_1$--

UNITED STATES PATENT AND TRADEMARK OFFICE
CERTIFICATE OF CORRECTION

PATENT NO. : 5,648,642
DATED : July 15, 1997
INVENTOR(S) : Robert J. Miller and Stephen J. Bisset It is certified that error appears in the above-indentified patent and that said Letters Patent is hereby corrected as shown below:

Column 13, line 37: delete "N-channel MOS current-limiting".

Column 15, line 31: replace "a" with --an--.

Column 18, lines 6 to 7: replace "circuit Z sum 62" with --Z sum circuit 62--.

Column 20, line 41: replace "ND" with --A/D--.

Column 25, line 64: replace" each, individual" with --each individual--.

Signed and Sealed this

Third Day of February, 1998

BRUCE LEHMAN

*Attest:*

*Attesting Officer*    Commissioner of Patents and Trademarks